United States Patent [19]

Servi et al.

[11] Patent Number: 6,115,462
[45] Date of Patent: Sep. 5, 2000

[54] METHOD AND APPARATUS FOR EFFICIENT CALL ROUTING

[75] Inventors: Leslie David Servi, Lincoln; Salal Humair, Cambridge, both of Mass.

[73] Assignee: GTE Laboratories Incorporated, Waltham, Mass.

[21] Appl. No.: 09/005,039

[22] Filed: Jan. 9, 1998

[51] Int. Cl.[7] ...................................................... H04M 7/00
[52] U.S. Cl. .......................... 379/221; 379/219; 379/265; 370/252
[58] Field of Search ..................................... 379/219, 220, 379/221, 207, 139, 265, 266, 309, 93.17; 370/252, 468, 229, 230, 235, 238, 351; 455/445

[56] References Cited

U.S. PATENT DOCUMENTS

| | | | |
|---|---|---|---|
| 4,979,118 | 12/1990 | Kheradpir | 379/221 |
| 5,164,983 | 11/1992 | Brown et al. | 379/265 |
| 5,179,589 | 1/1993 | Syu | 379/265 |
| 5,291,550 | 3/1994 | Levy et al. | 379/265 |
| 5,335,268 | 8/1994 | Kelly, Jr. et al. | 379/112 |
| 5,390,243 | 2/1995 | Casselman et al. | 379/265 |
| 5,519,773 | 5/1996 | Dumas et al. | 379/265 |
| 5,530,744 | 6/1996 | Charlalambous et al. | 379/265 |
| 5,570,419 | 10/1996 | Cave et al. | 379/266 |
| 5,640,445 | 6/1997 | David | 379/113 |
| 5,787,163 | 7/1998 | Taylor et al. | 379/265 |
| 5,812,654 | 9/1998 | Anderson et al. | 379/207 |
| 5,887,057 | 3/1999 | Pickeral | 379/265 |
| 5,889,799 | 3/1999 | Grossman et al. | 379/266 |
| 5,907,611 | 5/1999 | Dezonno et al. | 379/266 |
| 5,911,134 | 6/1999 | Castonguay et al. | 379/113 |

*Primary Examiner*—Krista Zele
*Assistant Examiner*—Benny Q. Tieu
*Attorney, Agent, or Firm*—Leonard Charles Suchyta

[57] ABSTRACT

A method and apparatus to calculate probabilistic routing parameters to more efficiently route telephone calls from an origin to one of a plurality of call centers. In particular, the rate of calls routed to each gate of each call center is measured for a previous time frame and used to estimate the rate of calls routed to input nodes of a routing network from an origin for a next time frame. Using these estimated rates of calls routed to the input nodes, a quadratic programming technique is used to calculate probabilistic routing parameters. These parameters are modified either automatically or by a network manager to improve the routing efficiency.

20 Claims, 11 Drawing Sheets

METHOD AND APPARATUS FOR EFFICIENT CALL ROUTING

FIELD OF THE INVENTION

The present invention relates to call routing. In particular, it relates to modifying probabilistic routing parameters to more efficiently route telephone calls to call centers.

BACKGROUND OF THE INVENTION

Toll-free telephone calls have become more and more prevalent in today's personal and business communications. With the increase in toll-free communication traffic, it has become more important as well as more difficult and complex to direct or route a toll-free telephone call from its point of origination to its final destination using an efficient communication path. As used in this application, efficiency refers to balancing the conflicting desires to evenly distribute communication path traffic and to simultaneously minimize communication path transmission costs. In particular, the complexity of toll-free telephone call routing has increased because a network manager must consider vast amounts of information and make choices from numerous possibilities when modifying a probabilistic routing parameter, which is described in more detail below.

A routing parameter is a variable used to select a particular communication path over which a telephone call travels. A network manager sets the probabilistic routing parameter, which is one of many routing parameters, based upon many pieces of information relating to communication path traffic and transmission costs. As the information regarding traffic and costs becomes available to the network manager, the network manager sets the probabilistic routing parameters to increases overall system efficiency. However, the information available to the network manager exceeds the network manager's ability to process the information. It is, therefore, desirable to automatically determine routing probabilities that can then be modified either automatically by a processor or manually by the network manager to improve the routing of telephone calls.

SUMMARY OF THE INVENTION

To attain the advantages and in accordance with the purpose of the invention, as embodied and broadly described herein, a method consistent with the present invention includes modifying probabilistic parameters of a routing network for a next time frame, comprising the steps, performed on a processor, of receiving information regarding a measured number of telephone calls routed through each of a plurality of output nodes for a previous time frame. Then the processor estimates a number of telephone calls routed to each of a plurality of input nodes for the previous time frame based on the measured number and calculates a plurality of probabilistic routing parameters for the next time frame based on these estimated numbers. Finally, the processor displays the plurality of calculated probabilistic routing parameters to a network manager, wherein the network manager modifies the probabilistic routing parameters.

An apparatus consistent with the present invention includes an apparatus for modifying probabilistic routing parameters of a routing network for a next time frame. The apparatus comprises a means for receiving information regarding a measured number of calls routed to each of a plurality of output nodes for a previous time frame. The apparatus has a means for estimating a number of calls routed to each of a plurality of input nodes for the next time frame based on the measured number. Using these estimated numbers, a means for calculating a first plurality of probabilistic routing parameters calculates the probabilistic routing parameters for the next time frame. Finally, the apparatus displays the first plurality of probabilistic routing parameters to a network manager, wherein the network manager modifies the probabilistic routing parameters.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate preferred embodiments of the invention and, together with the description, explain the goals, advantages and principles of the invention. In the drawings.

DESCRIPTION OF THE PREFERRED EMBODIMENT

Reference will now be made in detail to the present preferred embodiments of the invention, examples of which are illustrated in the accompanying drawings. The matter contained in the description below or shown in the accompanying drawings shall be interpreted as illustrative, and not limiting.

Current methodology to route toll-free telephone calls involves a network manager manually determining when and how much to modify probabilistic routing parameters. The present invention provides an apparatus and method that uses information obtained from a final destination (or gate) of toll-free telephone calls to determine probabilistic routing parameters that would improve toll-free telephone call routing efficiency. More efficient routing is achieved by modifying probabilistic routing parameters to balance the conflicting desires to evenly distribute communication path traffic and to simultaneously minimize communication path transmission costs. While the present invention provides improved efficiency in toll-free telephone call routing during normal operations, it is especially useful in assisting network operators to modify probabilistic routing parameters to compensate for large scale system changes, such as the elimination of one or more communication path, the inoperability of one or more call centers, or other catastrophic occurrences.

Figure 1:
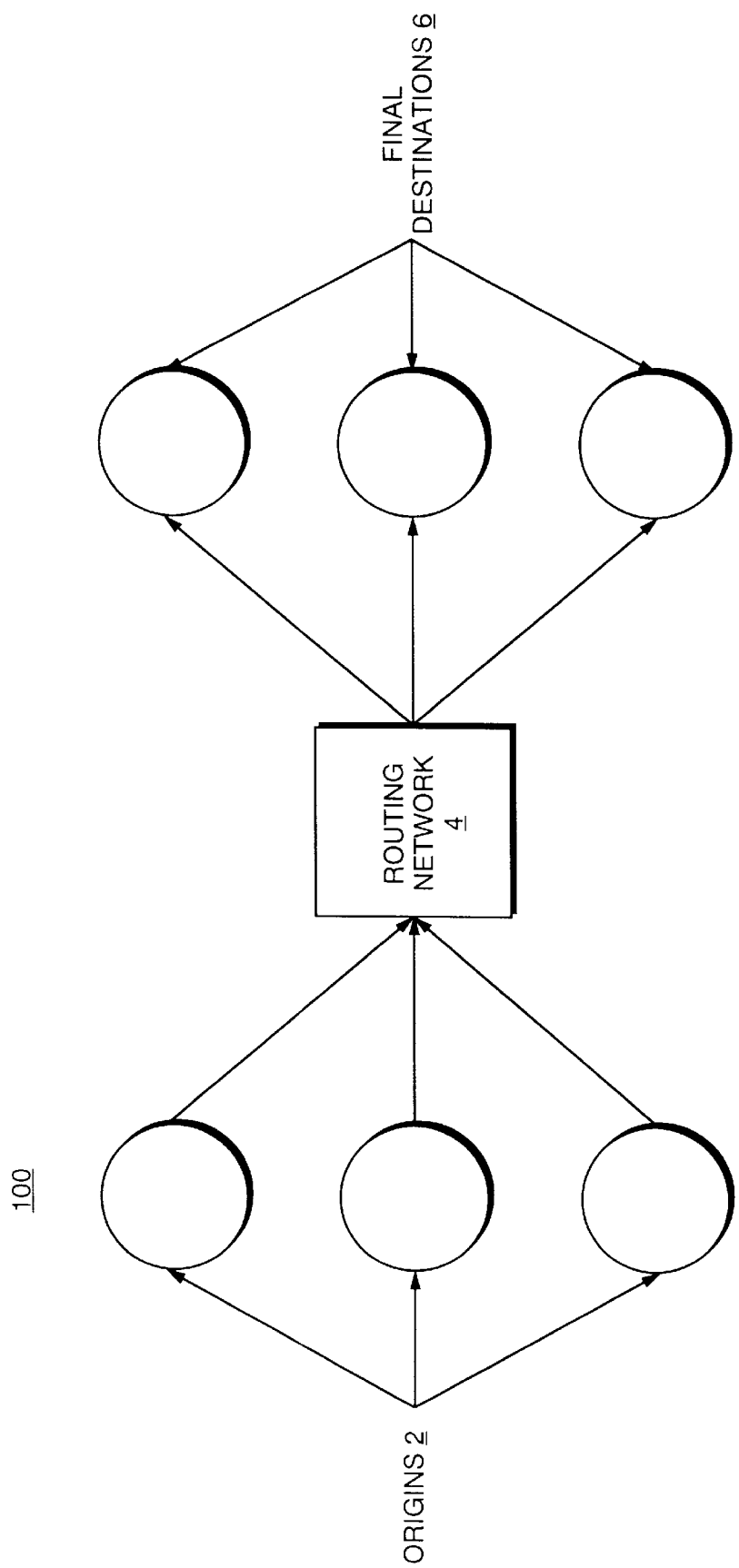
FIG. 1 is a block diagram of a telecommunication network.

FIG. 1 illustrates a typical telecommunication network 100. Telecommunication network 100 includes a plurality of toll-free telephone cat origins 2, a toll-free routing network 4, and a plurality of final destinations 6. Routing network 4 automatically routes toll-free telephone calls from one of the origins 2 to one of the possible final destinations 6 based on many routing parameters (not shown). A particular routing of a toll-free telephone call from one of the origins 2 to one of the final destinations 6 through routing network 4 is called a communication path (not shown).

Telecommunication network 100 operates by a caller dialing a toll-free number, such as 1-800-555-1234, that is input into routing network 4. Routing network 4 routes the toll-free telephone call to one of the plurality of final destinations 6 based on the routing parameters, which will be explained below. More particularly, when routing the toll-free telephone call, routing network 4 accesses a routing table (not shown) that contains routing decisions for each routing parameter based on information associated with the toll-free telephone call. In general, routing tables are designed such that most of the routing parameters are fixed (i.e., are fixed routing decisions). The routing tables also contain other routing parameters that have a fix routing decision that is based on the caller's input. Finally, the routing tables contain some routing parameters that are probabilistic routing parameters that make routing decisions based on probabilities that are established by the network manager.

Routing parameters with fixed routing decisions include routing parameters that make routing decisions based on an originating number that indicates from where the too-free telephone call is dialed (the calling number), a time of day of the toll-free telephone call, a toll-free telephone number dialed (the called number), etc. When the information associated with these routing parameters are identical for different toll-free telephone calls, routing network 4 makes the same fixed routing decisions. Other fixed routing decisions are based on a caller's input and route toll-free telephone calls in one of a plurality of communication paths. The caller based routing parameter is associated with an Interactive Voice Response Unit ("IVRU") that prompts the caller to input a response. The caller's input determines the one of the plurality of communication paths in which the toll-free telephone call is routed. What percentage of each caller inputs are received can be estimated by historical data based on characteristics of the toll-free telephone call, such as the calling number, the time of day, the called number, etc., that results in toll-free telephone calls being routed over one of the plurality of communication paths.

The probabilistic routing parameter routes toll-free telephone calls in one of a plurality of communication paths based on probabilities established by the network manager to improve toll-free telephone call routing efficiency. As needed, the network manager modifies these probabilities to balance the conflicting desires to evenly distribute communication path traffic and to simultaneously minimize communication path transmission costs.

Figure 2:
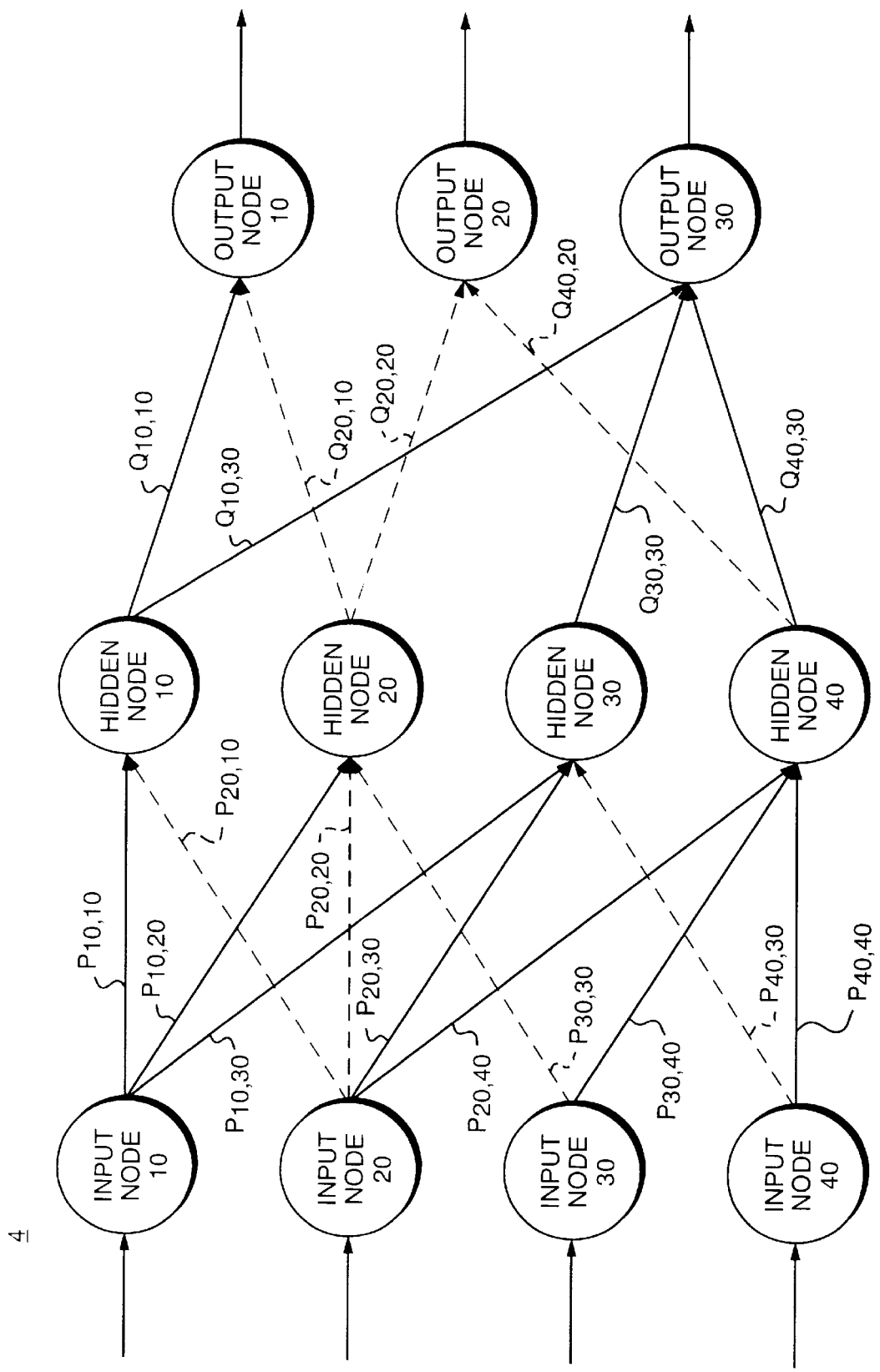
FIG. 2 is an illustration of the routing network of FIG. 1.

FIG. 2 shows a novel tri-partite graphic representation of routing network 4 (FIG. 1). Routing network 4 includes input nodes 10, 20, 30, and 40; hidden nodes 10, 20, 30, and 40; and output nodes 10, 20, and 30. The toll-free telephone calls routed into each input node, for example input node 10, represents a set of toll-free telephone calls being routed over a common set of fixed routing decisions. Some of the fixed routing decisions are implicit in associating the toll-free telephone calls with an input node. For example, all toll-free telephone calls originating from Lincoln, Mass. between 1 A.M. and 6 A.M. might be associated with input node 10. Toll-free telephone calls are input into routing network 4 at input nodes 10, 20, 30, and 40. Routing network 4 routes the toll-free calls from the input nodes to the hidden nodes based on the probabilistic routing parameter established by the network manager. These probabilistic routing parameters are represented by $P_{10,10}$; $P_{10,20}$; $P_{10,30}$; $P_{20,10}$; $P_{20,20}$; $P_{20,30}$; $P_{20,40}$; $P_{30,20}$; $P_{30,40}$; $P_{40,30}$; and $P_{40,40}$, where, for example, $P_{10,10}$ is the probability of routing a toll-free telephone call from input node 10 to hidden node 10. For both physical a nd economic reasons, not all input nodes can be routed to all hidden nodes, which would result in a zero probability of routing between those nodes. Routing network 4 routes toll-free calls from hidden nodes to output nodes based on input from the caller. The input from the caller can be estimated as a fixed probability based on a compilation of historical data. The fixed probabilities are represented by $Q_{10,10}$; $Q_{10,30}$; $Q_{20,10}$; $Q_{20,20}$; $Q_{30,30}$; $Q_{40,20}$; and $Q_{40,30}$, where, for example $Q_{10,10}$ is the probability of routing a toll-free-telephone call from hidden node 10 to output node 10. Again for physical and economic reasons, not all hidden nodes are routed to all output nodes, which results in a zero probability of routing between those nodes.

While FIG. 2 represents one possible routing network 4, it is to be understood that routing network 4 typically will have a much larger number of input, hidden, and output nodes with various routing arcs between the input and hidden nodes, and the hidden and output nodes. Additionally, once routing network 4 was represented by the tri-partite graph of FIG. 2, it was recognized that some portions of the tripartite graph typically contained a large amount of redundancies. For example, if all calls are routed from input node 10 in a manner identical to all cal routed from input node 20, then input nodes 10 and 20 would be collapsed into a single input node. Collapsing the redundancies has a dramatic impact on the computational requirements of the method and apparatus.

Once routing network 4 was represented by the tripartite graph of FIG. 2, it was recognized that it would be possible to calculate probabilistic routing parameters, which are represented by $P_{10,10}$; $P_{10,20}$; $P_{10,30}$; $P_{10,10}$; $P_{10,20}$; $P_{20,30}$; $P_{20,40}$; $P_{30,20}$; $P_{30,40}$; $P_{40,30}$; and $P_{40,40}$, to improve toll-free telephone call routing efficiency, as shown below.

Calculating the probabilistic routing parameters for a next time frame ("time frame n+1") involves estimating an arrival rate at each input node 10, 20, 30, and 40 ("input node i") for the time frame n+1 and then calculating the probabilistic routing parameters based on the estimated arrival rates. The estimated arrival rate at, for example, input node 10, is the estimated number of toll-free telephone calls routed from the plurality of origins 2 (FIG. 1) to input node 10 (FIG. 2) of network 4 per unit of time.

It is possible to estimate the arrival rate at an input node i for the time frame n+1 from a measured rate of toll-free telephone calls routed through output nodes 10, 20, and 30 ("output nodes j") during a previous time frame ("time frame n"). Measuring the rate of toll-free telephone calls routed through any output node j is well known in the art.

Once the measured rate of toll-free telephone calls being routed through output nodes j is obtained for the time frame n, applying equation #1, below, estimates the arrival rate of toll-free telephone calls to input node i for time frame n+1. While equation #1 is the preferred estimation, other estimation techniques are possible. For example, the estimated arrival rate for the nodes could be predicted using measurements as well as a particular time of day of the toll-free telephone calls.

$$\lambda_i^e(n+1) = \lambda_i^e(n) \sum_j \frac{\gamma_j^m(n) p_{i,j}(n)}{\sum_k \lambda_k^e(n) p_{k,j}(n)} \quad \text{equation\#1}$$

where $\lambda_i^e(n+1)$ is the estimated arrival rate of toll-free telephone calls to input node i during time frame n+1, $\lambda_i^e(n)$ is the estimated arrival rate of toll-free telephone calls to input node i during time frame n, $\gamma_j^m(n)$ is the measured rate of toll-free telephone calls routed through output node j during time frame n, and $p_{ij}(n)$ is the probability that a toll-free telephone call arriving at input node i is routed through output node j via one of the hidden nodes 10, 20, 30, or 40 ("hidden nodes m") during time frame n. $p_{ij}(n)$ is a combination of the probability of a toll-free telephone call being routed from input node i to any one of the hidden nodes m, and the probability of being further routed from that hidden node to output node j during time frame n, as shown in equation #2.

$$p_{ij}(n) = \sum_m P_{i,m}(n) Q_{m,j}(n) \quad \text{equation\#2}$$

where $P_{i,m}(n)$ is the probability that a toll-free telephone call arriving at input node i is routed to hidden node m during time frame n (this is the probabilistic routing parameter set by the network manager) and where $Q_{mj}(n)$ is the probability that a toll-free telephone call will be routed from hidden node m to output node j during time frame n (this is a fixed probability that estimates the caller's input based on historical data). Notice that the $p_{ij}(n)$ is zero if there is no possible communication path over which routing network 4 could route a toll-free telephone call from the input node to the output node. For example, referring to FIG. 2, the probability of routing a call from input node 40 to output node 10, $p_{40,10}(n)$, is zero.

Once the estimated arrival rate of toll-free telephone calls being input to input node i during time frame n+1 is determined, it is possible to estimate the rate of toll-free telephone calls that will be routed through output node j for time frame n+1 by applying equation #3.

$$\gamma_j^e(n+1) = \sum_i \lambda_i^e(n+1) p_{i,j}(n+1) \quad \text{equation\#3}$$

$\gamma_j^e(n+1)$ is the estimated arrival rate of toll-free telephone calls at output node j during time frame n+1. $\lambda_i^e(n+1)$ was solved for in equation #1. $p_{ij}(n+1)$ is a combination of the probability of a toll-free telephone call being routed from input node i to hidden node m and the probability of being further routed from hidden node m to output node j during time frame n+1.

In order to obtain the goal of improving the efficiency of toll-free telephone call routing, the present invention minimizes a weighted average of communication path traffic load and communication path transmission costs. This can be done by a iterative procedure that solves for the variable probabilities, which are represented by $P_{10,10}$; $P_{10,20}$; $P_{10,30}$; $P_{20,10}$; $P_{20,20}$; $P_{20,30}$; $P_{10,40}$; $P_{30,20}$; $P_{30,40}$; $P_{40,30}$; and $P_{40,40}$, that will minimize the weighted average of equation #4.

$$\alpha_1 \sum_k \left[ \frac{(\gamma_k^e + \gamma_k^q)}{\mu_k^e} - \frac{1}{G} \sum_i \frac{(\gamma_i^e + \gamma_i^q)}{\mu_i^e} \right]^2 + \alpha_2 \sum_i \sum_j \lambda_i^e c_{i,j} p_{i,j} \quad \text{equation\#4}$$

$\alpha_1$, and $\alpha_2$ are scalar weight factors that represent the relative importance of balancing communication path traffic and minimizing communication path trans mission costs, respectively, $\gamma_j^e/\mu_j^e$ is the estimated expected traffic load (i.e., the arrival rate at output node j divided by an average call duration time $\mu_j^e$) of output node j, $\gamma_j^q/\mu_j^e$ is the estimated expected traffic load based on toll-free telephone calls that have already been routed to output node j and are currently queued for service at output node j, and $\mu_j^e$ are estimates based on a weighted average service rate at output node j during all preceding time frames (weight factors necessary to generate the estimate are preset by the network operator). $c_{ij}$ and $p_{ij}$ are the transmission costs and the probability (as defined in equation #3), respectively, associated with routing a toll-free telephone call from input node i to output node j during time frame n+1. While equation #4 represents one preferred measure of the routing network's efficiency, one of ordinary skill in the art would now recognize that other measures are available.

The probabilities that minimize equation #4 can be determined by a modified type of quadratic programming. Equation #4 requires modification to the quadratic program because it has several important linear constraints. The first type of constraints are that the solutions reached by the quadratic program must be non-negative. The second type of constraints are that the probabilistic routing parameters associated with each input node i must have a sum equal to one. The third type of constraints are that because of current routing table design, some of the probabilistic routing parameters set by the network manager are constrained to be equal to each other. Once the quadratic program is modified to incorporate these constraints, methods that are well known in the art can be used to solve the quadratic program.

As noted above, current routing table design makes it necessary to constrain some of the probabilistic routing parameters that route toll-free telephone calls from input nodes i to hidden nodes m to have equal probabilities. This results from considerations, such as the geographic proximity corresponding to different output nodes, that suggest designing routing tables containing routing parameters that are independent of the called number although the hidden node (and hence the output node) that the toll-free telephone call is routed to is dependent on the called number. For example, in FIG. 2 suppose those toll-free telephone calls originating from Lincoln, Massachusetts between 1 A.M. and 6 A.M. calling 1-800-314-1593 are represented by input node 30 and those toll-free telephone calls originating from Lincoln, Mass. between 1 A.M. and 6 A.M. calling 1-800-271-8282 are represented by input node 40. The routing table might be designed to have the routing probability between input node 30 and hidden node 20 constrained to be equal to the routing probability between input node 40 and hidden node 30 as well as constrained to have the routing probability between input node 20 and hidden node 40 equal to that between input node 30 and hidden node 40.

It is preferred to modify all the probabilities associated with probabilistic routing parameters, However, it may be both practical and preferable to vary the probabilities associated with probabilistic routing parameters of no more than a selected number k of input nodes to reduce the number of parameters that need to be manually updated. Modifying only a selected number k of input nodes may still achieve nearly all of the maximal possible increase in the efficiency of toll-free telephone call routing. The selected number of input nodes, k, can be preset by the network manager. The key to receiving most of the improved efficiency is determining which set of k input nodes should have their probabilities modified to minimize equation #4 above. One method would be to individually solve equation #4 using each possible sets of k input nodes to determine which probabilistic routing parameters should be changed. This option, however, typically requires an impractically large amount of computing time and power for realistic routing networks. A preferred alternative is to heuristically identify which probabilistic routing parameters should be changed for the time frame n+1 using the following three step method:

Firstly, for each input node i identify and minimize the relevant quadratic programming problem associated with equation #4 using the three types of linear constraints identified above and the additional constraint that all probabilistic routing parameters not originating from input node i be constrained to equal their value during the time frame n. If the solution method entails an iterative procedure, a preferred method is to undertake only one iteration and thereby sacrifice some quality of the solution in the interests of saving computational time and cost.

Secondly, of the solutions found in the first step identify the k input nodes that result in the lowest achieved value of equation #4.

Thirdly, minimize the relevant quadratic programming problem associated with equation #4 using the three types of linear constraints identified above and the additional constraint that those probabilistic routing parameters not associated with the k input nodes identified in the second step be to equal their value during the time frame n.

Figure 3:
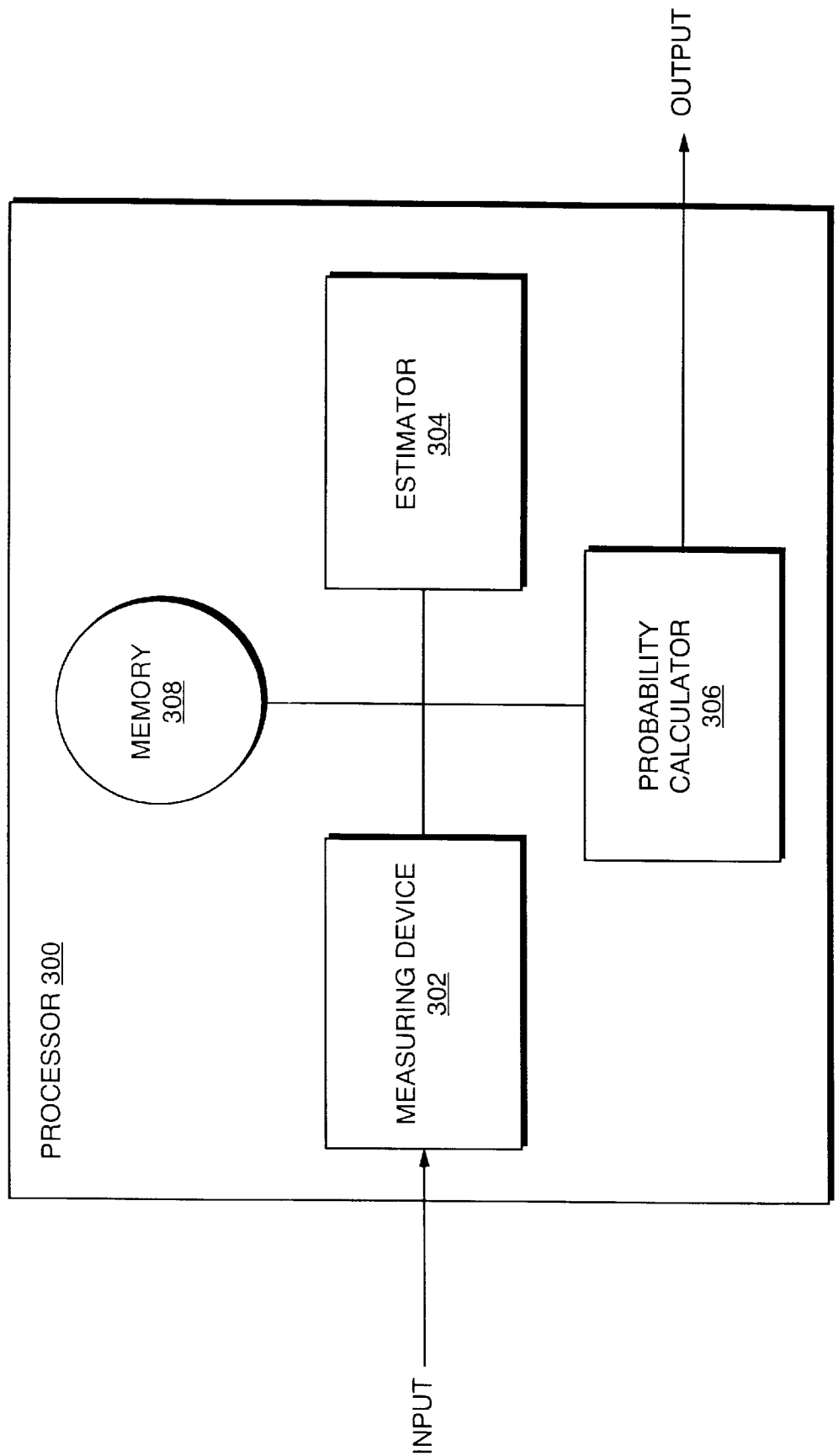
FIG. 3 is block diagram of a processor configured in accordance with the present invention.

FIG. 3 is a functional block diagram of a processor 300 capable of performing the above toll-free telephone call routing. Processor 300 includes a measuring device 302, an estimator 304, a probability calculator 306, and memory 308. Processor 300 further includes an initializer portion (not shown) that is necessary to construct a tri-partite graph of FIG. 2 from the routing tables of the existing routing network 4 (FIG. 1). The initializer translates the routing tables to generate the plurality of input nodes, hidden nodes, output nodes j, and the appropriate routing arcs therebetween of the tri-partite graph, FIG. 2. The tri-partite graph formed by the initializer is typically very large; therefore, the initializer further functions to identify and eliminate redundancies (i.e., mathematical equivalents) in order to generate a smaller tri-partite graph. Once the tri-partite graph is established, processor 300 functions by receiving at measuring device 302 input regarding a number of toll-free telephone calls routed through each of output nodes j for a time frame n. Measuring device 302 stores these numbers of toll-free telephone calls routed through each output node in memory 308 at addresses (not shown). Estimator 304 uses these numbers of toll-free telephone calls routed through each output node j stored in memory 308 to estimate the number of incoming toll-free telephone calls routed to each input node i using, for example, equation 1. The estimated number of incoming toll-free telephone calls routed to each input node i during time frame n+1 is also stored in memory 308 at addresses (not shown) for the respective input node i. Probability calculator 306 uses these estimated numbers of incoming toll-free telephone calls routed to each input node i stored in memory 308 to solve for the variable probabilities that will improve system efficiency, equation #4. After the probabilities are calculated, processor 300 displays the probabilities on a display (not shown) to a network manager who used the displayed information to modify the probabilistic routing parameters to improve routing efficiency. Alternatively, processor 300 automatically modifies the probabilistic routing parameters to improve routing efficiency.

In a preferred embodiment, the function of measuring device 302, estimator 304, and probability calculator 306 are performed in software by processor 300. In other preferred embodiments, the functions of measuring device 302, estimator 304, and probability calculator 306 are performed by system hardware. In still other preferred embodiments the functions of measuring device 302, estimator 304, and probability calculator 306 are performed by a combination of software and hardware.

The above described method and apparatus has been demonstrated to balance the conflicting desires to evenly distribute communication path traffic and minimize communication path transmission costs in lab simulations. In the lab simulation, the software for the various parts were written in C-programing code and can be run on any suitable compiler.

Figure 4B:
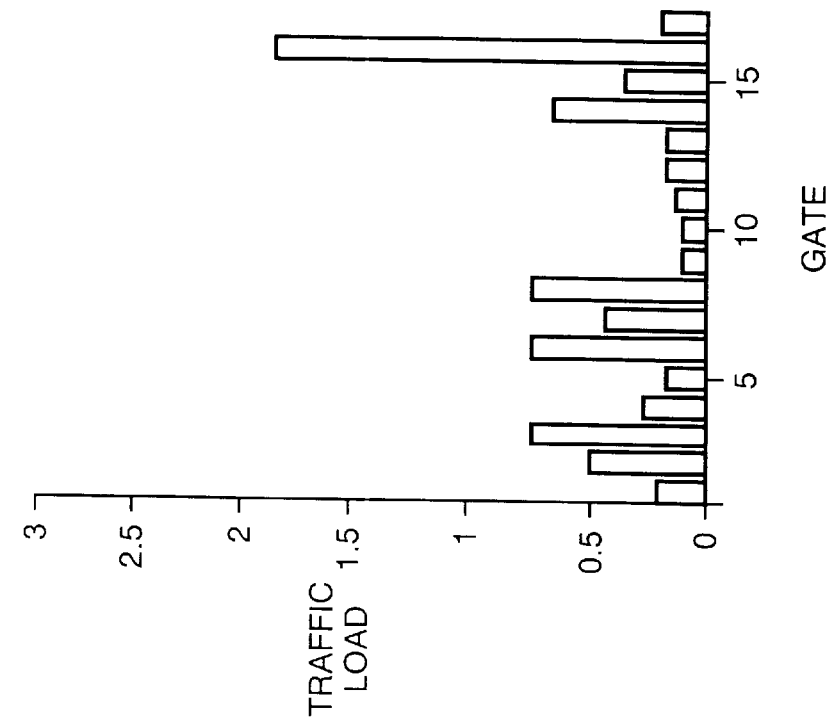
FIGS. 4a–4f are graphical representations of communication traffic load balancing over successive iterations using the device of FIG. 3.
Figure 4A:
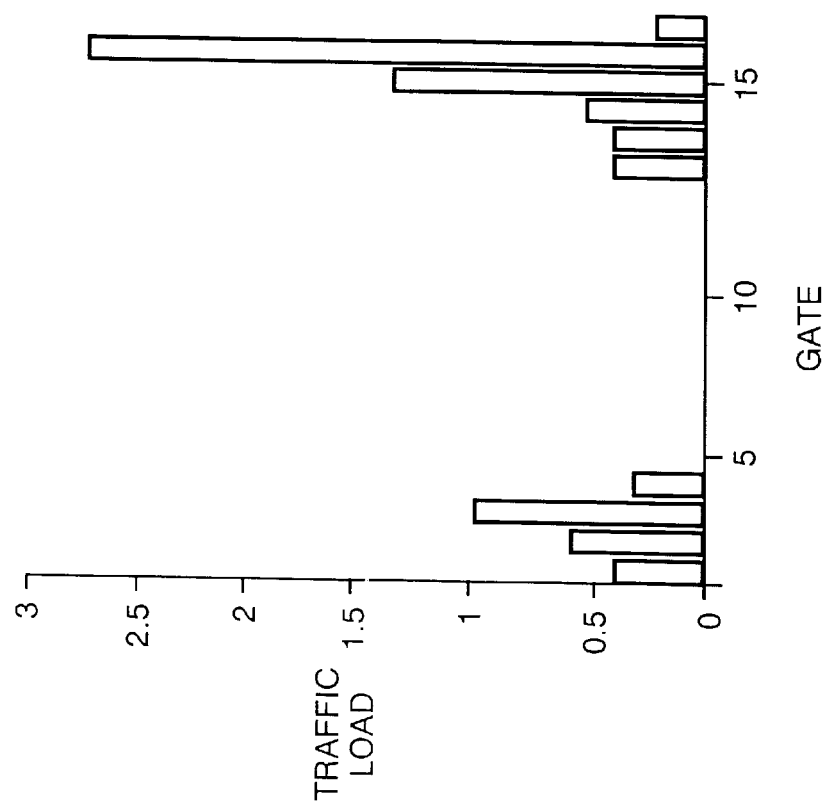
Figure 4D:
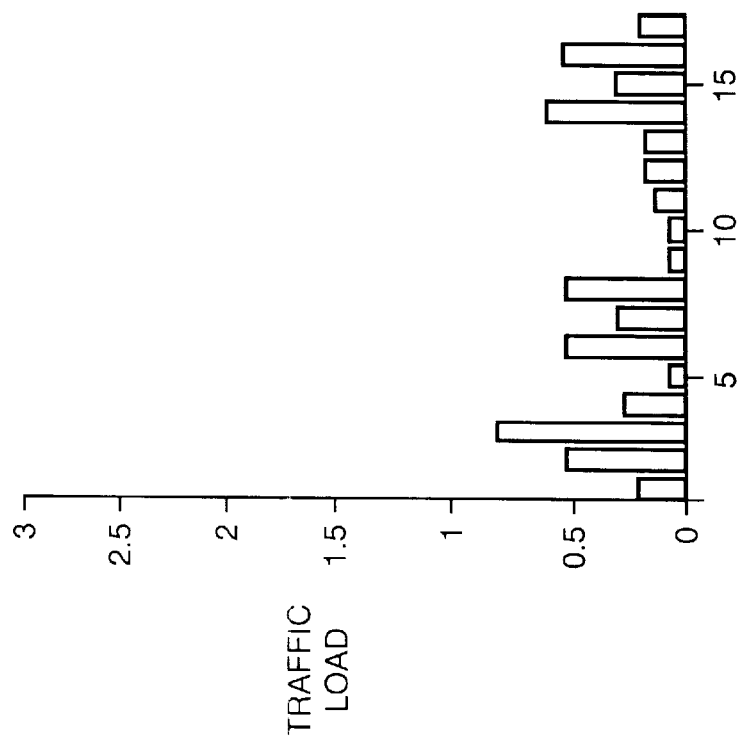
Figure 4C:
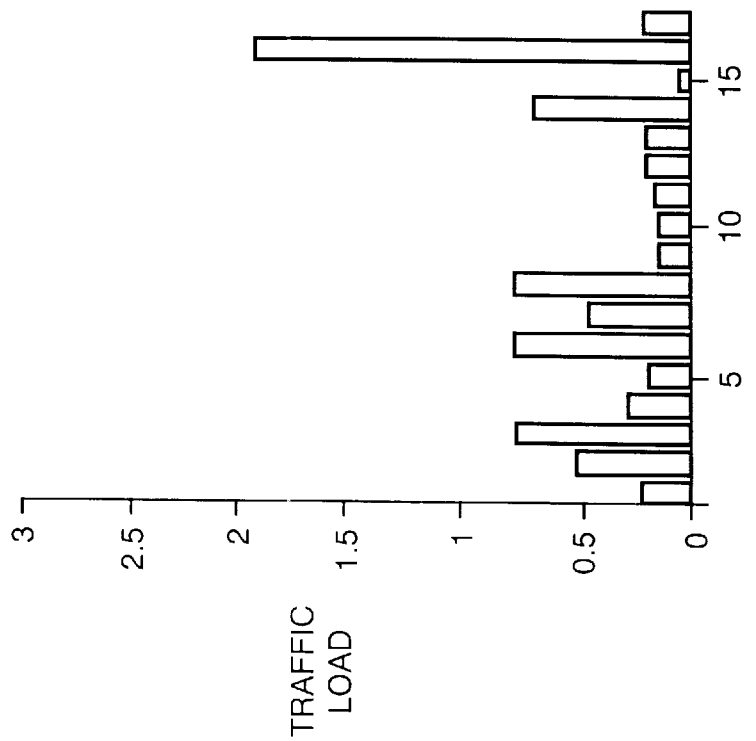
Figure 4F:
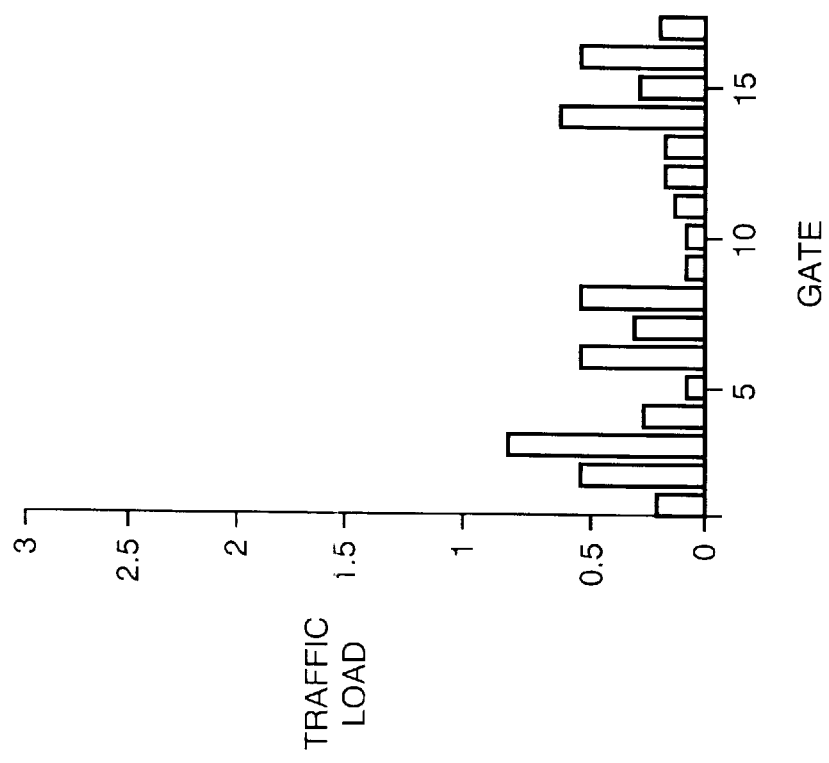
Figure 4E:
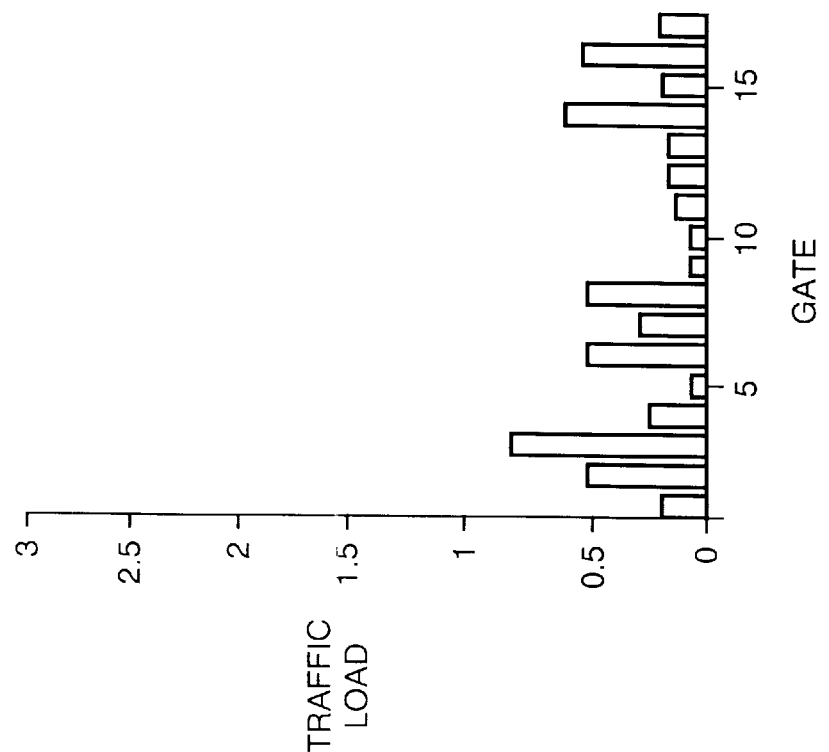

FIGS. 4a–4f illustrate an experimental test of the methods and apparatus consistent with the present invention. In particular, FIG. 4a shows an initial distribution of communication path traffic that is not balanced. FIGS. 4b–4f show five successive iterations of routing networks constructed in accordance with the present invention. FIG. 4a shows the initial distribution for time frame n=1. FIG. 4b–f show the distribution for time frames 2–5. As can be seen in FIG. 4d, most of the achievable load balancing was achieved by the technique after the fourth iteration.

Additionally, it is apparent that while the above described method and apparatus has been described in relation to toll-free call routing methodology it is equally applicable to other call routing methodologies.

Implementation Details

The seemingly simple problem of automating a manual decision process for routing geographically distributed toll free calls to call centers is riddled with complexity. Manual legacy systems are often based on a decision tree in which branches correspond to identifying information about the call (e.g., the geographical state of origination of the call, the time of initiation, etc.) and/or the routing decisions prior to the branch. Apart from some routing probabilities which are assigned by operators at discrete time instants, most decisions in such trees are fixed. Operators typically use their intuition about the system and the state of the call centers at fixed intervals of time to assign routing probabilities to the decision tree. They seek to balance the traffic load among call centers while being mindful of transmission costs and the temporal variations in the traffic intensity. Typically, not all call centers have agents trained to handle all calls from all locations. Also, in some implementations, the routing parameters are linked, i.e., changing the routing for some types of calls affects the routing of other types of calls. For both of these reasons perfect load balancing might be impossible. Furthermore, any algorithm that replaces the operator must respond to sudden network changes (e.g., a call center or major link temporarily becoming disabled) and account for the dynamics of the resulting traffic backlog at a center that must slowly be worked off while potential new calls are diverted. Finally, since updating the decision tree is a manual process, a short prioritized list of the most important routing changes is more valuable than an optimal solution that entails continually adjusting all routing probabilities. This paper considers a model for a typical decision tree that allows us to treat the manual decision process with all its complexity.

The problem described above can be viewed as routing arrivals from multiple independent non-homogeneous Poisson streams to a set of parallel M/M/k/∞ queues to balance the workloads on the queues and minimize transmission costs. We consider a model where (i) the routing policies are restricted to be Bernoulli, (ii) the rates of the arrival processes are unobservable, (iii) the state of the system is observed at discrete time instants and the routing policies are fixed during a time interval, (iv) queues have different service rates and number of servers and (v) arrivals from each stream must be routed to a fixed subset of queues. These characteristics closely parallel practical constraints that are often imposed on the routing decisions.

We decompose the problem of finding Bernoulli routing policies for the model into the following two problems: (i) estimating the arrival rate for each Poisson arrival process in the previous time interval, given the history of the number of arrivals at each call center in the previous intervals, the history of number of calls serviced at each call center and the history of the routing probability assignment, (ii) computing an optimal probability assignment to minimize a weighted sum of transmission costs and load variance on the centers, assuming that the estimated rates are correct and will prevail for the next time period.

A practical variant of the problem is to find the best subset (of a pre-specified size) of arrival streams and its associated routing probabilities to optimize the objective function. We solve this problem using a heuristic which ranks given subsets of arrival streams using gradient information around a given probability assignment and then optimizes over the best subsets. Empirical results indicate that the heuristic works very well in achieving optimal objective function values very close to the lower bound that is achievable.

Our approach for estimating arrival rates and determining optimal probabilities is studied in a simulation for a decision tree containing 99 arrival streams and 17 call centers. We present empirical results validating the load balancing performance of the routing algorithm and the prioritization heuristic.

A brief description of the problem of routing/assigning customers to parallel exponential queues is provided in the next subsection. The second section presents the example decision tree in detail. Section 3 presents the abstraction of the architecture as a tri-partite graph. Section 4 provides the exact formulation of the optimization problem to be solved at the beginning of each interval if the arrival rates are known. By simple transformation, a convex quadratic program is obtained at each step. Section 5 presents the estimator for inferring the arrival rates at the nodes. Section 6 presents the affine scaling method for solving the quadratic program. Section 7 presents the prioritization heuristic. Section 8 presents empirical results from a simulated test of the routing algorithm. Conclusions a re presented in section 9.

1 Problem of Routing/Assigning Customers to Parallel Exponential Queues

The problem of routing/assigning customers to parallel exponential queues comes in various versions depending on the nature of the arrival processes, the number of servers and the service rates available at each queue, constraints on assigning customers to subsets of queues, the cost structure of the system and the information available for making the routing decisions. Extensive literature exists for simple versions of the problem. When customers arrive to the system according to a single homogeneous Poisson process, the queues are M/M/1 with equal service rates and there are no constraints on the queues to which a customer may be assigned, many results are known for both infinite and finite capacity queues for different kinds of information and cost structures. Recent results show that in most versions of the problem, when queue lengths are known at the time routing decisions are taken, the shortest queue policy—which assigns the customer to the queue with the shortest length is optimal for minimizing holding costs linear in the system time or for maximizing the system throughput. When information is only available about the past routing decisions, the optimal policy is shown to be round robin which cyclically assigns arriving customers to queues. When service rates are not identical, it is much more difficult to find optimal policies.

So far, no results exist in the literature on optimal policies for the model we consider.

Specifically, we address the problem where (i) arrivals are from multiple non-homogeneous Poisson processes, (ii) the queues are M/M/k/∞ with different number of servers and service rates for each queue, (iii) each arrival can be assigned only to a given subset of the queues, (iv) the assignment probabilities of certain classes of customers to certain queues must be identical, (v) the cost structure of the system is dependent on the routing decisions and is non-linear and (vi) only partial information is available about the queue lengths with assignments being fixed for intervals of time rather than decided at each customer arrival. Since the problem seems analytically intractable, we focus our efforts on finding a suboptimal assignment that is easy to implement and performs well empirically.

2. The Existing Routing Architecture

The actual architecture consists of a decision tree (FIG. 5) for routing calls in which two decision stages are probabilistic, the first assignable and the second fixed.

2.1 The decision tree

Figure 5:
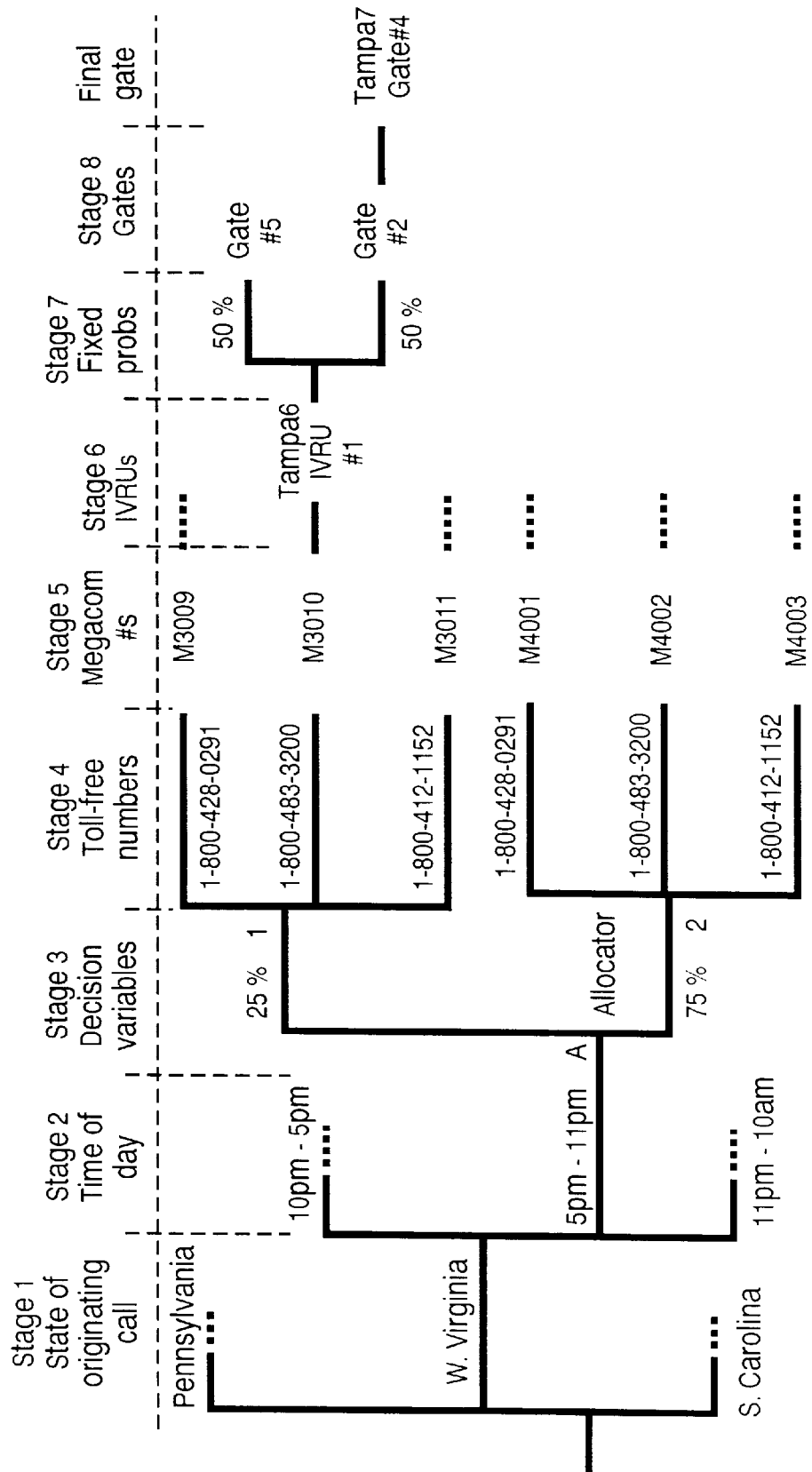
FIG. 5 is a diagram of an exemplary decision tree.

FIG. 5 shows a small section of the decision tree. The gates on the right hand side are in the call centers where the calls are finally serviced. Calls, arriving at the first stage are routed based on the state of origination. For instance, calls from West Virginia are routed differently than calls from Pennsylvania. The second stage routes based on the time of day the call arrives (to exploit time zone and operating hours differences between the call centers), and certain other characteristics which are not shown for clarity of presentation. The third stage is an allocator node (A in FIG. 5), which routes calls probabilistically to a set of nodes (1 and 2 in FIG. 5).

The call goes to a megacom number based on the 1-800 number that was dialed.

For instance, in the tree of FIG. 5 a call to 1-800-428-0291 from West Virginia that originated between 5 pm and 11 pm is routed to megacom number M3009 with probability 0.25 and to megacom number M4001 with probability 0.75. The se probabilities are assigned at fixed intervals of time and are typically a function of, for example, the originating state and the time of day.

Each megacom number transfers the calls to an Interactive Voice Response Unit (IVRU) which verifies that the call is indeed intended for the type of service we will route it to. These are the automated greetings one hears when one calls 1-800 numbers. From an IVRU, the calls are again split probabilistically to different gates based on the caller's responses. These probabilities are viewed as fixed based on historical calling patterns. The next node could be a terminal gate or a transition to another gate, but no further routing takes place there.

2.2 The Information Structure

The information received by the operator at the start of each interval consists of the following: for each gate, she knows the number of arrivals in the last interval, the average service time of calls, the number of servers and certain other information such as the service level (the fraction of calls answered in less than 30 seconds) at each gate which she might want to use for routing purposes.

2.3 The Control Process

Based on the gate data and the parameters of the previous decision tree, the operator may assign new probabilities to the decision tree to minimize transmission cost and minimize load variance on the gates in the next intervals.

Sometimes the operator may wish to change only a few sets of probabilities in the decision tree rather than assigning all of them. This is partly because assignment of probabilities is a manual operation which is time consuming for a large set of nodes and partly because sometimes the network can be load balanced reasonably well by changing a very small set of routing probabilities in the tree.

3. The Tri-partsite Graph Model of the Decision Tree

This section presents a tri-partite graph model of the decision tree and outlines the difficulties in obtaining optimal routing policies from the model. We conclude by presenting a certainty equivalent controller in which the control process is decomposed into an estimation part and an optimization part.

3.1 The Tri-partite Graph

Figure 6:
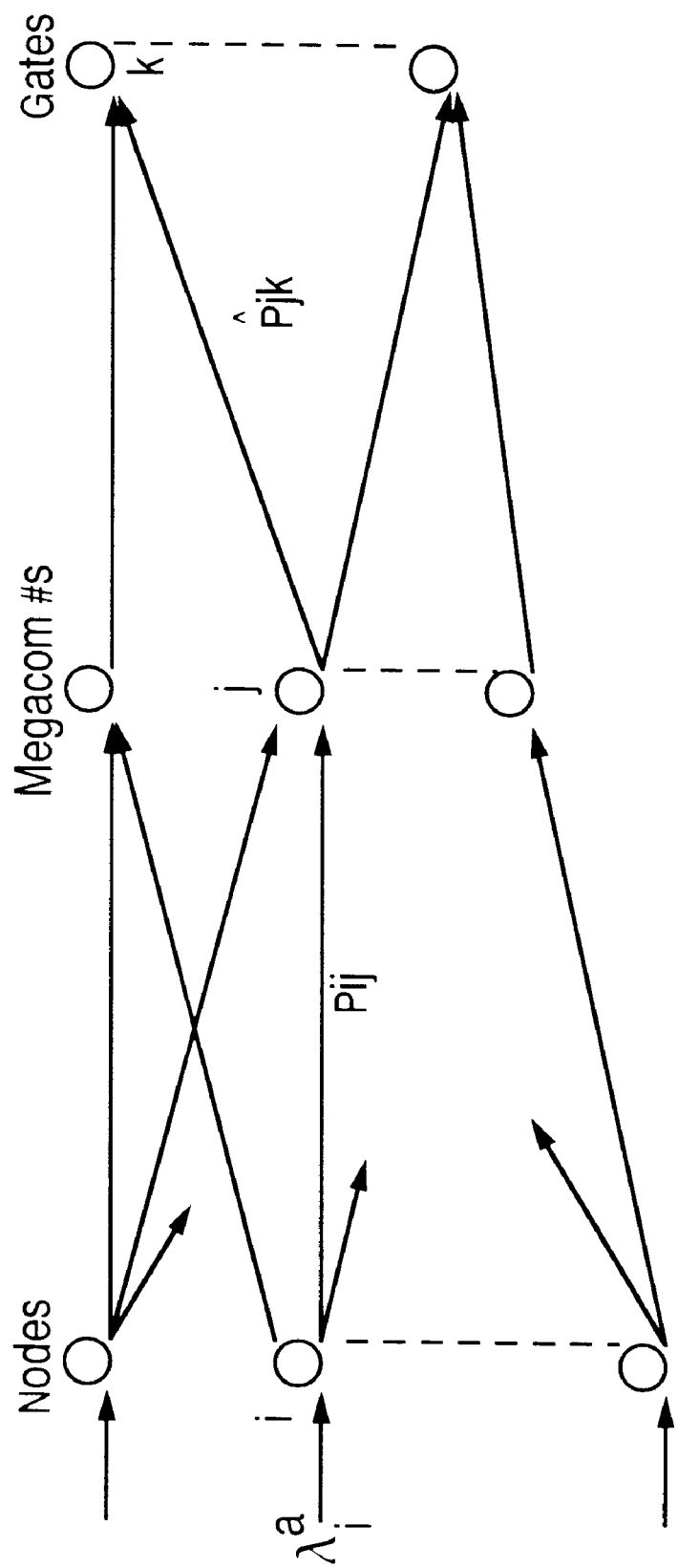
FIG. 6 is a diagram of a tripartite graph representation of a decision tree.

We abstract the decision tree as a tri-partite graph as shown in FIG. 6. The nodes on the left hand side, middle and right hand side represent allocator/1-800 number combinations, megacom numbers and gates respectively in the decision tree. An arc exists in the graph from a left hand side node to a middle node if it is possible to route a call from that allocator/1-800 number to the megacom number in the decision tree. The probability assigned to the arc is the probability assignment to the triple allocator/1-800 number/ megacom number in stage 3 of the decision tree. An arc exists in the graph from a middle node to a right hand side node if it is possible to route a call from that megacom number to that final gate in the decision tree. The probability assignment to each such arc is fixed and is obtained from stage 7 of the decision tree.

Note from the decision tree in FIG. 5 that the arc from node allocator A/ 1-800-428-0291 to megacom number M3009 must have the same probability assignment as the arc from node allocator A/1-800-483-3200 to megacom number M3010. More generally, many arcs in the graph are constrained to have the same probability assignment.

We next renumber the nodes in the graph such that the nodes corresponding the same allocator are numbered consecutively. For instance, allocator A/1-800-429-0291 is node 1, allocator A/1-800-483-3200 is node 2 and allocator A/1-800-412-1152 is node 3. Henceforth, references to nodes, megacom number and gates will be in the context of the tripartite graph.

3.2 Finding Optimal Routing Policies for the Graph

The routing problem in the graph can easily be formulated as a Markovian linear control problem with unidentifiable parameters and quadratic cost. Linear system, quadratic cost models have been studied extensively with various instances permitting nice analytical solutions for the optimal policy. Unfortunately, it is difficult to use well known optimal control laws using, for instance, the asymptotic Ricatti equation. Specifically, this is because (i) the arrival rates of calls at the nodes of the graph are unidentifiable, (ii) the time period between updates of the system is fifteen minutes, making it hard to model the disturbances in the Markovian model as white noise, and (iii) the probabilities must be non-negative and sum to one, whereas general results in the linear system, quadratic cost model assume unconstrained control.

A general suboptimal controller for quadratic cost systems is a certainty equivalence controller. In this approach, an optimal control is computed at each stage by fixing all uncertain quantities at their expected values. We propose a two-step certainty equivalence controller for routing in the graph as follows.

1. Given the history of the number of arrivals at each gate, the history of the observed service times and the history of the routing probability assignments, estimate the arrival rates at the nodes and the service rates at the gates for a given inter val.
2. Assume that the problem is deterministic, i.e. the arrival rates and service rates will be fixed to their estimates for the next interval. Compute the probabilities needed to optimize a given objective function of the probabilities and the estimated rates. Update the probabilities for the next stage.

The assumptions underlying this step are that (i) the arrival rates and service rates can be estimated accurately from the history, (ii) the arrival rates vary slowly enough to be able to use the rates from the last interval for the next interval and (iii) any systematic deviation of the number of arrivals at each node from the expected arrivals is small enough to be ignored.

The optimization problem obtained in step 2 is explained in the next section. Step 1 is addressed in Section 5 which presents a very simple estimator for arrival rate and service rate estimation.

4. Formulating the Optimization Problem $P_o$

We formulate the optimization problem $P_o$ which is solved every fifteen minutes to determine optimal routing probabilities for the next interval.

4.1 Notation

The following notation is used for the formulation.

$n \in \{1, 2, \ldots \}$: A discrete index representing the intervals between updates of the probabilities.

$\Delta t$: The length of each interval n.

For the graph, define:

N: The number of nodes in the graph.

M: The number of megacom numbers in the graph.

G: The number of gates in the graph/decision tree.

$A_1$: The arc set of the first stage of the tripartite graph. $A_1 = \{(i,j) i=1, \ldots, N \; j=1, \ldots, M|$ it is possible to route from node i to megacom number j$\}$ $A_2$: The arc set of the second stage of the tri-partite graph. $A_2 = \{(j,k) j=1, \ldots, M \; k=1, \ldots, G|$ it is possible to route from megacom number j to gate k$\}$ $\bar{p}_{jk}$: The fixed routing probability assigned to $(j,k) \in A_2$. $\bar{p}_{jk}=0$ if $(j,k) \notin A_2$.

$\bar{c}_{ij}$: The cost/call-sec of routing a call along $(i,j) \in A_1$.

For the decision tree, define:

A: The number of allocators in the decision tree.

$B_i$: The number of branches following allocator i in the decision tree according to some numbering $1, \ldots, A$ of the allocators.

$S = \Sigma_{i=1}^{A} B_i$: The total number of branches following the allocators in the decision tree. $q_{mk}$: The probability assigned to branch k of allocator m in the decision tree for any interval n, $m=1, \ldots, A$ and $k=1, \ldots, B_m$.

For the nth time interval, let:

$N_k^q$: The number of calls in queue at gate k at the start of the interval.

$\lambda_i^a(n)$: The actual arrival rate at the ith node.

$\lambda_i^e(n)$:. The estimated arrival rate for the ith node.

$\mu_k^a(n)$: The actual total available service rate at gate k.

$\mu_k^e(n)$: The estimated total available service rate for gate k.

$\gamma_k^a(n)$: The actual total arrival rate at gate k.

$\gamma_k^e(n)$: The estimated total arrival rate at gate k.

$p_{ij}(n)$: The routing probability assigned to $(i,j) \in A_1$. $p_{ij}(n)=0$ if $(i,j) \notin A_1$.

Let:

$$\gamma_k^q(n) = \frac{N_k^q(n)}{\Delta t} :$$

The additional arrival rate for the next interval due to the customers already in the queue.

$$c_{i,j} = \overline{c}_{ij} \sum_{k=1}^{G} \frac{\overline{p}_{jk}}{\mu_k} :$$

The average cost/call-minute of using arc (i,j) in the graph. Using the above quantities, we define the following vector notation:

$p = (p_{11}, \ldots, p_{N1}, \ldots, p_{1M}, \ldots, p_{NM})^T \in R^{|A_1|}$ is the vector of probabilities assigned to the arcs of the first stage of the graph.

$\overline{c} = (\lambda_1^e c_{11}, \ldots, \lambda_N^e c_{N1}, \ldots, \lambda_1^e c_{1M}, \ldots, \lambda_N^e c_{NM})^T \in R^{|A|}$ is a weighted cost vector associated with the arcs in $A_1$. It is to be understood again that only those $\lambda_i^e c_{ij}$ terms are included such that $(i,j) \in A_1$.

$q = (q_{11}, \ldots, q_{1 \, B_1}, \ldots, q_{A1}, \ldots, q_{A \, B_A})^T \in R^S$ is the vector of probabilities associated with each branch in the decision tree following the allocators.

$$\gamma^e = \left(\frac{\gamma_1^e}{\mu_1^e}, \ldots, \frac{\gamma_G^e}{\mu_G^e}\right)^T \in R^G.$$

$$\gamma^q = \left(\frac{\gamma_1^q}{\mu_1^e}, \ldots, \frac{\gamma_G^q}{\mu_G^e}\right)^T \in R^G.$$

$\overline{P} = [P_{jk}] \in R^{M \times G}$ with $$P_{jk} = \frac{\overline{p}_{jk}}{\mu_k^e},$$

is the probability matrix for the second stage of the graph.

$\Lambda = [\Lambda_{js}] \in R^{M \times |A_1|} \cdot \Lambda_{js} = \lambda_i$ if the sth component of p is $p_{ij}$ for some i, and $\Lambda_{js} = 0$ otherwise. $\Lambda$ is the matrix of arrival rates at the nodes with dimensions compatible with p to let $\Lambda p$ give the arrival rate vector at the gates.

I represents the identity matrix of appropriate dimensions relevant to the context in which it appears.

e is the vector of 1's of appropriate dimensions relevant to its context.

For the above quantities, a fundamental relationship between arrival rates at the gates and the nodes is given by $$\gamma_k^e(n) = \sum_{i=1}^{N} \lambda_i^e(n) \left( \sum_{j=1}^{M} p_{ij}(n) \overline{p}_{jk} \right), k = 1, \ldots, G.$$

An equivalent relationship in vector notation can be written as:

$$\gamma^e = \overline{P}^T \Lambda p. \qquad (1)$$

This is true since the arrival process at the megacom numbers has the average arrival rate $\Lambda p$, therefore the arrival process at the gates obeys $\gamma^{eT} = (\Lambda p)^T \overline{P}$.

4.2 The Constraints

The probability assignments need to obey the following constraints for every n:

$$\sum_{j:(i,j) \in A_1} p_{ij}(n) = 1 \quad i = 1, \ldots, N, \qquad (2)$$

$$p_{ij}(n) \geq 0, \qquad (i,j) \in A_1.$$

In addition, as noted in section 3.1, the probabilities of some arcs are constrained to be equal to each other owing to the construction of the tripartite graph from the decision tree. The structure of these constraints can be formalized by using the correspondence between the arcs in the graph and the branches following the allocators in the decision tree.

Number the allocators in the decision tree from 1, ..., A. The number of branches following allocator m in the decision tree is $B_m$ with $q_{mk}$ representing the probability assignment to branch (m,k), k=1, ..., $B_m$. It follows that $$\sum_{k=1}^{B_m} q_{mk} = 1,$$

$q_{mk} \geq 0, m=1, \ldots, A, k=1, \ldots, B_m$. Now note the following relationship between the allocators in the decision tree and the nodes in the graph. Allocator m corresponds to a set of the nodes $N_m$ of the graph, such that the sets $N_i$, i=1, ..., A partition the nodes of the graph. Each node in a set $N_m$ has the same number of arcs in the tripartite graph which is equal to $B_m$, the number of branches of the allocator. Let $Q_{mk}$ be the subset of arcs in the graph that are constrained to have the same routing probabilities $q_{mk}$ because they correspond to the branches following the same allocator in the decision tree. We let the subscript mn in $q_{mk}$ refer to allocator m and the subscript k refer to the kth branch of allocator m. This establishes a correspondence between the branches in the decision tree and a set of arcs in the graph. The description of the sets $Q_{mk}$ can be obtained from the decision tree during the construction of the tripartite graph. We thus have the following constraints on the probabilities in the graph. Note that the constraints below imply the constraints (2).

$$\sum_{k=1}^{B_m} q_{mk} = 1, m = 1, \ldots, A,$$

$$q_{mk} \geq 0, m = 1, \ldots, A \text{ and } k = 1, \ldots, B_m,$$

$$p_{ij} = q_{mk}(i,j) \in Q_{mk} \; m = 1, \ldots, A \text{ and } k = 1, \ldots, B_m$$

which can be written in vector notation as:

-continued $$Aq = e, \quad (3)$$
$$q \geq 0,$$
$$p = Tq,$$

which can be written in vector notation as:

$$Aq = e, \quad (3)$$
$$q \geq 0,$$
$$p = Tq,$$

where $A \in R^{A \times S}$ is a matrix of 1's and 0's and e is of dimension A. Row m of A corresponds to allocator m, or equivalently, the subset $N_m$ of the nodes and columns correspond to the constraint $\Sigma_{k=1}^{B_m} q_{mk} = 1$. This reduces the number of constraints on the probabilities to be the number of allocators A rather than the number of nodes N as in (2). The matrix $T \in R^{|A_1| \times S}$ is the mapping from the allocators in the decision tree to the probabilities in the graph. It is constructed from the Sets $Q_{mk}$ and has exactly one 1 in each row and zeroes elsewhere.

We will formulate and solve the problem in terms of the variables $q_{mk}$, since given $q_{mk}$ and the sets $Q_{mk}$ form m=1, ..., A, k=1, ..., $B_m$, we can always set $p_{ij} = q_{mk}$ for all $(i,j) \in Q_{mk}$.

This significantly reduces the dimension of the problem as well as simplifying the structure of the constraints.

4.3 The Objective Function

Our basic objective is balancing the service levels of calls across all call centers, or alternatively stated, reducing the variance of the service levels across call centers, where "service level" is defined as the fraction of the calls experiencing delay less than 30 seconds until the start of service. This entails working with the transient solution for call delays in M/M/k queues. While this is possible using the Chapman-Kolmogorov equations, closed form expressions are not known. We therefore look for a measure that would adequately represent the expected delay for a call at a queue.

The selected measure for reducing the variance of the service levels must satisfy the following criteria. First, it must be a reasonable reflection of the approximate delay relative to the other queues. Second, it must avoid the possibility of the probability assignments responding too quickly to queue overloads. This is because the assignments will govern for the next fifteen minutes which is relatively large compared to the interarrival times. Third, the measure must be such that the objective function can be optimized quickly relative to the length of the intervals.

For the above reasons, we use the expected total utilization (the offered load divided by the expected maximum work rate available) as a proxy for the service level at each queue. The basic assumption underlying the selection of this measure is that the number of servers at the queues and their service rates are not widely varying. The utilization ratio ceases to be a reasonable measure of the relative service levels at the queues when the maximum available service rate at different queues varies significantly.

These considerations lead to the following formulation of the objective function. We weigh the routing costs and the expected total utilization ratio at the gates, as shown below (the subscripts (n) have been dropped to reduce visual clutter).

$$\alpha_1 \sum_{k=1}^{G} \left[ \frac{(\gamma_k^e + \gamma_k^q)}{\mu_k^e} - \frac{1}{G} \sum_{i=1}^{G} \frac{(\gamma_i^e + \gamma_i^q)}{\mu_i^e} \right]^2 + \alpha_2 \sum_{(i,j) \in A_1} \lambda_i^e c_{ij} p_{ij}, \quad (4)$$

$$\alpha_1, \alpha_2 \geq 0$$

where $\alpha_1$, $\alpha_2$ are chosen scalars.

The quantity $$\frac{[\gamma_k^e(n) + \gamma_k^q(n)]}{\mu_k^e(n)}$$

is interpreted as the expected total utilization of gate k during the nth period.

$$\frac{\gamma_k^e(n)}{\mu_k^e(n)}$$

is the estimated expected utilization of gate k during the nth period due to the arriving workload, whereas $$\frac{\gamma_k^q(n)}{\mu_k^e(n)}$$

is the estimated expected utilization of gate k's capacity by the work already in the system.

The first component of this function induces a penalty for any deviation from the average expected total utilization at each gate. Minimizing it is therefore the same as trying to balance the expected load on all the stations. The second component of the objective function is the total expected cost of routing under the probability assignments $p_{ij}$. The relative importance of the two components can be adjusted by varying the coefficients $\alpha_1$ and $\alpha 2$.

4.4 The Formulation

We can combine (3) and (4) in the following formulation:

$$P_o : \min \; q^T H q + c^T q + r$$
$$\text{s.t.} \; Aq = e,$$
$$q \geq 0$$

where $$H = \alpha_1 T^T \Lambda^T \bar{P} \left( I - \frac{1}{G} ee^T \right) \bar{P}^T \Lambda^T,$$

$$c^T = 2\alpha_1 \gamma^{qT} \left( I - \frac{1}{G} ee^T \right) \bar{P}^T \Lambda T + \alpha_2 \bar{c}^T T,$$

$$r = \alpha_1 \gamma^{qT} \left( I - \frac{1}{G} ee^T \right) \gamma^q.$$

The above formulation is obtained by rewriting the objective function using the following steps.

In vector notation:

$$\sum_{k=1}^{G} \left( \frac{\gamma_k^e + \gamma_k^q}{\mu_k^e} - \frac{1}{G} \sum_{i=1}^{G} \frac{\gamma_i^e + \gamma_i^q}{\mu_i^e} \right)^2 = \quad (a)$$

$$(\gamma^e + \gamma^q)^T \left( 1 - \frac{1}{G} ee^T \right) (\gamma^e + \gamma^q),$$

-continued
$$\sum_{(i,j)\in A_1} \lambda_i^e c_{ij} p_{ij} = \bar{c}^T P_1$$

From (1) and p=Tq, we get $\gamma^e = \bar{P}^T \Lambda Tq$. Expanding (a) using this relation, we get the following formulation for the objective function (4).

$$\alpha_1 q^T T^T \Lambda^T \bar{P} \left(I - \frac{1}{G}ee^T\right) \bar{P}^T \Lambda Tq +$$

$$\alpha_1 2\gamma^{q^T}\left(I - \frac{1}{G}ee^T\right) \bar{P}^T \Lambda Tq + \alpha_1 \gamma^{q^T}\left(I - \frac{1}{G}ee^T\right)\gamma^q + \alpha_2 \bar{c}^T Tq$$

4.5 Observations about $P_o$

1. From Aq=e q≧0, the feasible region is closed and bounded. Since the objective function is continuous in q, an optimal solution to $P_o$ exists by Weirstrass's theorem.
2. The matrix H is symmetric and positive semi-definite, therefore the objective function is convex, and Karush-Kuhn-Tucker (KKT) conditions are necessary and sufficient for characterizing optimal solutions of $P_o$. To see that H is symmetric, note that $$\left(I - \frac{1}{G}ee^T\right)$$

is symmetric. For positive semi-definiteness, note that $$\left(I - \frac{1}{G}ee^T\right)^T\left(I - \frac{1}{G}ee^T\right) = \left(I - \frac{1}{G}ee^T\right),$$

therefore $H = M^T M$ where $M = (I - \frac{1}{G}ee^T)\bar{P}^T \Lambda T$. Thus $x^T H x = (Mx)^T(Mx) \geq 0$, $\forall x$.

3. The matrix A has the following form:

$$A = \begin{bmatrix} 1...1 & ... & ... & ... \\ ... & 1...1 & ... & ... \\ \vdots & \vdots & \ddots & \vdots \\ ... & ... & ... & 1...1 \end{bmatrix}$$

To see this, recall that each row of the matrix A corresponds to the following system of equations: $\Sigma_{k=1}^{B_m} q_{mk} = 1$ m=1, ..., A. Therefore, an entry $\alpha_{mj}=1$ only when $\Sigma_{r=1}^{m-1} B_r < j \leq \Sigma_{r=1}^{m} B_r$.

5. Estimating Arrival Rates and Service Rates

To solve $P_o$ for period n, in addition to the number of calls in queue at each gate at the end of the last interval, we need the arrival rates at the nodes $\lambda_i(n)$, i=1, ..., N, and the service rates at the gates $\mu_j(n)$, j=1, ..., G. In this section, we present a simple heuristic for estimating the arrival rate for any interval, given the number of arrivals at each gate, the routing probabilities and the estimated rates at each node for the last time interval $\lambda_i(n-1)$, n≧1, i=1, ..., N. Service rate estimation turns out to be a simpler problem because we assume these are not time-dependent.

The need to use a heuristic for arrival rate estimation is motivated by the fact that one has much less data than one needs to infer the arrival rates with any satisfactory accuracy. Still, one wants to do something reasonable since the problem does need to be solved. Specific problems indicating the difficulty of estimating arrival rates follow:

(1) Simple estimation approaches such as linear least squares are inapplicable since the matrix $P^T$ has rank less than the number of parameters to be estimated. More specifically, the number of arrival rates to be estimated is typically much larger than the number of gates. Therefore, given the system $P^T \lambda = N \Delta t$, it is impossible to uniquely determine the arrival rate vector $\lambda$ for any given observation vector N using linear least squares. Further, the linear least squares estimator does not guarantee non-negative estimates of $\lambda$ for all N (cf. Appendix A.1).

(2) An unconstrained maximum likelihood estimator (MLE) resuts in the maximization or a non-linear objective function with intractable Karush-Kuhn-Tucker (KKT) conditions.

(3) Sophisticated approaches such as Kalman filtering require the existence of an underlying linear Markovian model describing the dynamics of the arrival rate process, which is difficult both to specify and validate.

Our heuristic for estimating arrival rates uses a simple assumption to update the conditional expectation of the arrival rates for the new interval based on the observed data at the gates and the routing probabilities for the last interval.

5.1 The Estimation Approach

We use the most recent arrival rate estimates and the number of arrivals at the gates from the last period for computing the new estimates. All previous values are discarded. We present the estimator below and its derivation in section 5.2.

Let $N_j(n)$, j=1, ..., G be the number of arrivals at gate j in the interval n. Let $\tilde{p}ij(n) = \Sigma_{k=1}^{M} P_{ik}(n)\hat{p}_{kj}$, i=1, ..., N j=1, ..., G. Let $S(i)=\{j|j=1, ..., G, \tilde{p}_{ij}(n)>0, \gamma_j(n)>0\}$. Then the formula for estimating $\lambda_i^a(n+1)$ is given by:

$$\lambda_i^e(n+1) = \begin{cases} 0, & S(i) = \emptyset \\ \frac{1}{\Delta t}\lambda_i^e(n)\left[\sum_{j\in S(i)} \frac{N_j(n)\tilde{p}_{ij}(n)}{\sum_{k=1}^{N}\lambda_k^e(n)\tilde{p}_{kj}(n)}\right] & \text{otherwise,} \end{cases} \quad (5)$$

$$i = 1, ..., N$$

A significantly easier problem is the estimation of the service rates under the assumption that the rates remain constant across time. We obtain the service rate for period n as a weighted sum of the number of people served in the last period $N_j^s(n)$ and the previously estimated rate using the formula $$\mu_j(n+1) = \frac{1}{2}\frac{N_j^s(n)}{\Delta t} + \frac{1}{2}\mu_j(n)$$

$$j = 1, ..., G \quad n = 1, ..., \infty$$

with $\mu_j(1)$=know that the estimator suffers from at least the following problems. The values of the estimates are highly dependent on the initial conditions. In particular, the estimator must be started off with the true values of the rates for the assumption of conditional expectations to hold. Further, one can always construct a case where the estimator will not converge to the true rates even if the rates do not change over time. This is because we ignore the history of the process and use only the data from the last period in our calculations. And finally, if an estimated rate becomes zero at a node, it can never become non-zero. However, in view of the almost impossible difficulties outlined at the start of section 5, we think our approach is still intelligent compared to a blind guess.

6. Solving $P_o$ Using The Affine Scaling Method

Convex quadratic programming is a well understood problem and is not much harder than linear programming in terms of computational complexity. In particular, exact solutions are obtainable by solving related Linear Complementarity problems using Lemke's algorithm. Further, a range of interior point methods exists for solving the problem. For references to the Linear Complementarity problem, Lemke's algorithm and interior point methods for solving quadratic programs.

We use the affine scaling method to solve $P_o$ for the optimal q. The affine scaling algorithm is the analogue of the steepest descent method in unconstrained optimization. It starts from an initial feasible vector and at each iteration, uses Dikin ellipsoids to identify the steepest descent direction and then moves along it an optimal amount without violating feasibility. Termination occurs when the improvement in the objective function becomes exceedingly small $$\frac{N_j^s(0)}{\Delta t}$$

and $\mu_j(0)$ being any non-negative guess. Although plain averaging of $N_j^s(n)$ should converge with probability 1 to the true rates, we use a weighted combination to react to pathologically low realized service rates in the last interval. This turns out to be an important consideration for identification of disaster scenarios.

5.2 Observations about the Estimation Approach

1. As explained below, the formula for $\lambda_i^e(n+1)$ can be obtained using the assumption that $\lambda_i^e(n)$ for $i=1, \ldots, N$ at each n are the true arrival rates $\lambda_i^a(n)$. Under this assumption the formula gives exactly the conditional expectation of the arrival rate at each node and is unbiased. The derivation of (5) follows below.

In any period n, if (i) request arrivals at the nodes constitute independent Poisson processes, (ii) the routing of each call at the nodes and the megacom numbers is independent of all other calls, and (iii) the estimated rates for the last time interval are the true rates, the arrival process at any given gate j consists of a superposition of independent Poisson processes and is Poisson with rate $\Sigma_{i=1}^{N} \lambda_i^e(n) \tilde{p}_{ij}(n)$. Let $\xi$ be the following event: "number of arrivals at the gate is $N_j(n) j=1, \ldots, G$ and the actual arrival rate equals the estimated arrival rates, $\lambda_i^e(n)$ $i=1, \ldots, N$". Then we have E (Arrivals at node i in period $n|\xi$)=

$$\sum_{j \in S(i)}$$

E(Arrivals at gate j from $$E(\text{Arrivals at node } i \text{ in period } n | \xi) = $$

$$\sum_{j \in S(i)} E(\text{Arrivals at gate } j \text{ from node } i | \xi) = $$

$$\sum_{j \in S(i)} N_j(n) \lambda_i^e(n) \frac{\tilde{p}_{ij}(n)}{\sum_{k=1}^{N} \lambda_k^e(n) \tilde{p}_{kj}(n)} \quad i = 1, \ldots, N.$$

The estimator $\lambda_i^e(n+1)$ can now be obtained by dividing both sides of the above equation by $\Delta t$, giving (5). In addition, without too much difficulty, under the same assumption used in the above derivation, it can be shown that the variance of the new estimates is bounded by a small number for reasonably connected graphs.

2. Without the assumption mentioned above, the heuristic can be viewed to be an approximation to the MLE for the arrival rates with non-negativity constraints. The MLE for the arrival rates is given by the solution to the following system of equations subject to the constraints that the estimates at all nodes must be strictly positive. These equations are obtained from the Kuhn-Tucker conditions for maximizing the likelihood function over non-negative $\lambda_i$'s.

$$\frac{1}{\Delta t} \sum_{j=1}^{G} \frac{N_j(n) \tilde{p}_{ij}(n)}{\sum_{k=1}^{N} \lambda_k(n) \tilde{p}_{kj}(n)} = 1 \quad i, \ldots, N$$

$$\lambda_i(n) \geq 0$$

A comparison of the above equations with the heuristic suggests that the heuristic tries to rescale the estimates $\lambda_i^e(n+1)$ if the ratio $$\frac{1}{\Delta t} \sum_{j=1}^{G} \frac{N_j(n) \tilde{p}_{ij}(n)}{\sum_{k=1}^{N} \lambda_k(n) \tilde{p}_{kj}(n)} \neq 1,$$

increasing the V estimate if the ratio is less than 1 and decreasing it if the ratio is greater than 1.

3. There are obvious advantages and disadvantages to the proposed scheme. It is clearly very easy to implement and compute the estimates. On the other hand, we in each step. In contrast to Lemke's algorithm which gives an exact solution to a convex quadratic program, the affine scaling algorithm terminates in an E-neighborhood of an optimal solution. On the other hand, the affine scaling algorithm is particularly simple to implement. We chose the affine scaling algorithm because it leads very nicely to a prioritization heuristic for the constraints in addition to its ease of implementation and the fact that routing probabilities are not required to be very precise.

From the optimal q obtained from the affine scaling algorithm, the optimal p is obtained by the transformation p=Tq. The algorithm presented below and some of the subsequent observations are taken from.

6.1 The Algorithm

Let us describe the problem $P_o$ in its general form:

$$Q = \begin{bmatrix} \bar{q}_1 & & & \\ & \bar{q}_2 & & \\ & & \ddots & \\ & & & \bar{q}_n \end{bmatrix}.$$

and let the vector $q=(q_1, \ldots q_n)^T$, with n=S(cf section 4.1). Note the change in the subscripting of the components from the last section. This will lead to easier notation in the algorithm description.

For any $\bar{q} > 0$, let $$\bar{Q} = \begin{bmatrix} \bar{q}_1 & & & \\ & \bar{q}_2 & & \\ & & \ddots & \\ & & & \bar{q}_n \end{bmatrix}.$$

Initiaization: Set $\bar{q} > \hat{q} > 0$ such that $A\hat{q} = e$.

Step 1: Form the matrix $\bar{Q}^{-2}$ and compute $\bar{g} = 2H\bar{q} + 2H\bar{q} + c$, the gradient of the objective function at $\bar{q}$. Solve the Direction Finding Problem (DFP):

$$d = \text{argmin } \bar{g}^T d$$
$$\text{s.t. } Ad = 0,$$
$$d^T \bar{Q}^{-2} d \leq 1$$

The DFP identifies the direction of steepest descent, $\bar{d}$, within a Dikin ellipsoid centered around the current point $\bar{q}$ and strictly within the non-negative orthant. The equation $Ad=0$ ensures $A(\bar{q}+\bar{d})=e$ and $d^T\bar{Q}^{-2}d \leq 1$ ensures non-negativity of $\bar{q}+\bar{d}$ as explained in the appendix. The DFP can be solved easily using LU decomposition applied to a related system of linear equations (cf. Appendix B.2).

Step 2: If $\bar{Q}^{-2}\bar{d}=0$, stop; $\bar{q}$ is optimal. Otherwise go to step 3. It can be seen that if $\bar{Q}^{-2}\bar{d}=0$, $\bar{q}$ is a KKT point of the problem $P_o$ (cf. Appendix B.4), otherwise $\bar{d}$ is a feasible descent direction (cf. Appendix 13.3).

Step 3: Compute $$\bar{\lambda} = \text{argmin}_{\lambda \in R^1} (\bar{q} + \lambda \bar{d})^T H(\bar{q} + \lambda \bar{d}) + c^T(\bar{q} + \lambda \bar{d})$$
$$= -\frac{\bar{g}^T \bar{d}}{2\sqrt{\bar{d}^t H \bar{d}}}$$

$\bar{\lambda}$ is the minimizer of the objective function along the direction $\bar{d}$. The formula above is obtained by a simple one-dimensional minimization of the expression with respect to $\bar{\lambda}$. Note that moving $\bar{\lambda}$ along $\bar{d}$ may violate feasibility, therefore the next step.

Step 4: Set $$\begin{cases} \bar{q} := \bar{q} + \bar{\lambda}\bar{d}, & \text{if } \bar{q} + \bar{\lambda}\bar{d} > 0 \\ \bar{q} := \bar{q} + \alpha\bar{d}, & \text{otherwise; where } \alpha \in (0, 1) \end{cases}$$

where $\alpha \in (0, 1)$ is used to maintain strict positivity of the new point (B.1). Go to step 1.

6.2 Comments on the Algorithm and its Implementation

1. Initializing the algorithm with $\bar{q} > 0$ is trivial since there always exists a strictly positive solution to the probability assignments which can be obtained by splitting the probabilities evenly among all arcs coming out of a node.

2. The LU decomposition routine from Numerical Recipes is used to solve the DFP at every iteration. The algorithm typically finds the solution within 10 iterations when started in the middle of the feasible region, and in 1–3 iterations when started from a previous probability assignment. Assuming the estimation approach is correct, this shows that the arrival rates vary on a time scale much slower than fifteen minutes, justifying the use of the approximation that assumes the arrival rates for the previous period govern for the next period.

3. The stepsize $\alpha$ is chosen as 0.99. Choices of stepsize are often a difficult issue in implementation of algorithms for minimizing non-linear functions. 0.9–0.99 is a value often cited as being effective in literature for the affine scaling method. In an experiment with three different values of $\alpha$, 0.5, 0.75 and 0.99, we found that 0.99 worked the best.

4. In practice, we terminate in step 2 if we either find a KKT point or the improvement in the objective function is very small—we used a tolerance of 0.0001—after $\bar{q}$ has been modified in step 4. This is necessary since it is always possible that the optimal solution has some zero components, in which case we will tend to take increasing ly smaller steps towards the optimal, making the matrix $\bar{Q}^{-2}$ increasingly ill-conditioned.

7. The Allocator Prioritization Problem

Often, much or all of the desired load balancing on the call centers can be achieved by changing the probability assignments of only a few allocators in the decision tree. Motivated by a desire to reduce excessive operator actions for changing probabilities, we want to solve the following problem: Given an initial probability assignment for A allocators in the decision tree and a number $k \leq A$, which k allocators Probabilities should be changed to achieve the lowest possible value of the objective function for the next interval and what is an optimal probability assignments for them.

We introduce a little vocabulary for ease of exposition before proceeding. We shall say "optimizing over the set of constraints $I \subset \{1, \ldots, A\}$" to mean that only the variables $q_{ik}$, $i \in I$, $k=1, \ldots, B_i$ are allowed to be changed and the values of all other variables are fixed at a given probability assignment. Let $I_k \subset \{1, \ldots, A\}$ be a subset of constraints of cardinality k. Then optimizing over subsets $I_k$ of $\{1, \ldots, A\}$ corresponds to selecting k allocators in the decision tree and imposing the restriction that only these allocators' probabilities be changed.

Noting that every allocator in the decision tree corresponds to a constraint in $P_o$, we phrase the prioritization problem as: which subset of constraints $I_k$ of $P_o$ should we optimize over to get the lowest possible value of the objective function, given a feasible point $\bar{q}$ as a start. In order to obtain an exact solution to this problem, one must optimize over all possible subsets $I_k$ of constraints to obtain the respective optimal. Generally, this involves solving $$\binom{A}{k}$$

optimization problems, which is clearly undesirable from a computational perspective.

A heuristic for this problem is presented below. Instead of solving a combinatorial number of optimization problems, the heuristic only performs A steps of an affine scaling algorithm and solves one optimization problem by using gradient information around the current probability assignment. We demonstrate empirically in section 8 that minimization over the constraints selected using gradient information gives values reasonably close to the actual optimum.

7.1 A Heuristic for Prioritizing Partitions

This section presents the details of the heuristic. Section 7.2 presents an algorithm (algorithm B) for optimizing over any subset of constraints for a convex quadratic program with separable constraints, i.e. no variable appears in more than one constraint. The input to B are the problem data for the quadratic program and the indices of the constraints to optimize over. The heuristic follows:

1. Starting from $\bar{q}$ feasible for $P_o$, for each constraint i of $P_o$, apply a single iteration of algorithm B to the set $I_1=\{i\}$. Denote the value returned by the single iteration of B for constraint i as $d_i$.

This corresponds to finding first the direction of steepest descent such that moving along that direction can change only the variables $q_{ik}$, k=1, ..., $B_i$, involved in constraint i, keeping all other $q_{mk}$, m i, k=1, ..., $B_m$ fixed, and then determining the minimum value of the objective function along that direction.

2. Let $I_k=\{i: d_1$ is one of the lowest k values$\}$. This is the subset of constraints we have selected to optimize over. Or alternatively stated, we select k allocators whose probabilities will be changed.

3. Apply algorithm B to $I_k$ to obtain the optimal probability assignment.

7.2 The Modified Affine Scaling Algorithm B

Given an initial probability assignment for $P_o$ and some subset of constraints $I_k$, B presented below optimizes over the set of constraints $I_k$.

Before presenting the algorithm, we introduce the following additional notation.

$I_k = \{i | $ith constraint of $P_o$ selected for improvement$\}$, $|I_k|=$ k.

$I_k^c = \{j | \alpha_{ij}=1$ for $i \in I_k\} = \{j_1, \ldots, j_S\}$, assuming $|I_k^c|=s$: The set of columns of A corresponding to the variables in the set of constraints $I_k$. These correspond to the arcs in the decision tree associated with the allocation in $I_k$.

$A_{I_k,I_k^c}$: The submatrix consisting of rows $i \in I_k$ and columns $j \in I_k$ of A. Recall that the dimension of A is A×S, whereas the dimension of $A_{I_k,I_k^c}$ is k×s $x_{I_k^c} \in R^-$: For any vector $x \in R^S$, given $I_k^c$, we define $x_{I_k^c} = (x_{j_1}, \ldots, x_{j_s})$ as the subvector of x.

$$Q_{I_k^c,I_k^c}^{-2} = \begin{bmatrix} \frac{1}{q_{I_k^c,1}^2} & & & \\ & \frac{1}{q_{I_k^c,2}^2} & & \\ & & \ddots & \\ & & & \frac{1}{q_{I_k^c,s}^2} \end{bmatrix}$$

Initialization: Set $\bar{q}=q>0$ where q is the current probability assignment which we assume to be strickly positive. $Aq=e$ → $A_{I_k,I_k^c}\bar{q}_{I_k^c}=e_{I_k^c}$.

Step 1: Form the matrix $\bar{Q}_{I_k^c,I_k^c}$, and compute $\bar{g}=2H\bar{q}+c$, the gradient of the objective function at $\bar{q}$. From $\bar{g}$, obtain $\bar{g}_{I_k^c}$. Let $\bar{d} \in R^S$ equal 0, then set $\bar{d}_{ji}=(\bar{d}_r)_i$, for $0 \leq i \leq s$, where $\bar{d}_{I_k^c}$ is obtained by solving the following Direction Finding Problem (DFP):

$$\bar{d}_{I_k^c} = \text{argmin } \bar{g}_{I_k^c}^T d$$

$$\text{s.t. } A_{I_k,I_k^c} d = 0$$

$$d^T \bar{Q}_{I_k^c,I_k^c}^{-2} d \leq 1$$

Step 2: If $\bar{Q}^{-2}\bar{d}=0$ to: $\bar{q}_{I_k^c}$ is optimal and thus $\bar{q}$ is optimal. Otherwise go to step 3.

Step 3. Compute $$\bar{\lambda} = \text{argmin}_{\lambda \in R^1} (\bar{q}+\lambda\bar{d})^T H(\bar{q}+\lambda\bar{d}) + c^T(\bar{q}+\lambda\bar{d})$$

$$= -\frac{\bar{g}^T \bar{d}}{2\sqrt{\bar{d}^T H \bar{d}}}$$

Step 4: Set d as follows, then go to step 1.

$$\begin{cases} \bar{q} := \bar{q}+\bar{\lambda}\bar{d}, & \text{if } \bar{q}+\bar{\lambda}\bar{d} > 0 \\ \bar{q} := \bar{q}+\alpha\bar{d}, & \text{otherwise, } \alpha \in (0,1) \end{cases}$$

7.3 Comments on the Constraint Ranking Heuristic and the Modified Algorithm

1. Comments 2,3 and 4 mentioned in section 6.2 for the affine scaling algorithm are also true for B. In particular, to solve the above DFP, we use the same system of equations as in appendix B.2, with the matrices replaced appropriately by $\bar{Q}_{I_k^c,I_k^c}^{-2}$, and $A_{I_k,I_k^c}$.

2. A verbal explanation of the mechanism underlying the constraint ranking heuristic follows. Based on the gradient information around any feasible point, the heuristic looks at A mutually orthogonal subspaces (one subspace for each constraint) and determines for each subspace both the direction of maximum improvement and the optimal amount of movement along that direction without violating feasibility. It selects the $k \leq A$ subspaces that promise the most improvement. Subsequently, it throws away the remaining subspaces and searches for an optimal point in the k selected subspaces.

The fact that the subspaces are orthogonal and the subsequent throwing away of the unselected subspaces (constraints) follows from the structure of the matrix A. The part that needs justification is the selection of the k constraints based on the one step improvement exhibited. In general, there is no reason to believe that the k constraints that give the most one-step improvement will also lead to the lowest value of the objective function. See comment 4 below.

3. Algorithm B is not simply replacing the affine scaling algorithm with an algorithm for a smaller problem. It successively alternates between higher and lower dimensions to decide the directions of improvement and updating of the iterates.

The DFP for B is simply throwing away the A–k subspaces that are not interesting from both the constraints of $P_o$ and the linearized objective function around the current point, but the next step is different. To calculate the optimal amount of movement in the direction given by the DFP, we have to take into account the Hessian matrix H in step 3. Also, for the next iteration, the gradient must be determined based on the new point $\bar{q}$. Since the variables are coupled in the objective function, one cannot simply throw away the variables that cannot be changed. Consequently, the algorithm presented above is not simple replacing everything in the algorithm of section 6 by a smaller problem. The formal justification of why the DFP follows from $P_o$ even though the variables are coupled in the objective function is presented in the appendix C. 1.

4. So me intuition into the constraint ranking heuristic may be gained by considering the analogy between the affine scaling method and unconstrained optimization of quadratic functions using the steepest descent method. In the unconstrained version, selection of the constraints corresponds to fixing certain directions and considering only linear combinations of these directions. It is plain that the direction chosen may not be the best if the function is not well conditioned, or in layman terms, has very skewed contours. We expect a similar case with our proposed heuristic. When the function is well conditioned, we expect the heuristic to perform reasonably well in the selection process.

Quadratic functions are considered well-conditioned in the following sense: the difference between the lowest and the highest eigenvalues of the matrix H when only the variables belonging to each constraint are allowed to be varied is low. Conversely, they are ill-conditioned when the eigenvalue structure of the matrix in any of the selected k constraints is skewed. Since the eigenvalue structure is based on the arrival rates which are assumed to vary slowly with time, it is reasonable to expect that the structure of the objective function will not change drastically in fifteen minute intervals and the prioritization heuristic is expected to work reasonably. This is borne out by the empirical results of section 8.

8. Empirical Performance of the Routing Algorithm

We tested our routing approach in a Monte Carlo simulation. For test cases in which perfect load balancing was possible, the routing algorithm performed optimally. We present results for the more realistic case in which constraints imposed by the decision tree preclude perfect load balancing for arbitrary arrival and service rates.

The test decision tree resulted in a tri-partite graph with 99 nodes, 63 megacom numbers and 17 gates. The routing probabilities at the megacom numbers were fixed according to the decision tree. The number of allocators A of the nodes was 29. Calls were simulated from homogeneous Poisson processes for every fifteen minutes with different rates at each node. The gates were modeled as $M/M/k/\infty$ queues with arbitrarily chosen service rates but the same number of servers.

At initialization, the simulation asked for a parameter k from the user which was the number of allocators to optimize for. If the number k was less than A, the simulation would compute an optimal probability assignment at each interval based on the heuristic of section 7, otherwise it used the algorithm of section 6. The simulation started with an empty system—no calls queued at the gates. Optimal probability assignments were computed and assigned at fifteen minute intervals.

The routing for the first fifteen minute interval was done based on the routing probabilities read from stage 4 of the decision tree (refer to FIG. 5). For subsequent intervals, arrival rates for the nodes were estimated from the number of call arrivals at the gates in the previous interval and an optimal probability assignment was assigned based on the algorithm of section 6 or the heuristic of section 7.

The simulation generated data for each gate at the end of every fifteen minute interval. Specifically, it kept track of the number of call arrivals, the number served, the average handling time of calls and the service level.

8.1 General Performance

We ran the simulation for 9000 seconds for two different scenarios and focused on the total utilization levels (ratio of the realized arriving work plus the back-logged work to the mean available work capacity) at each gate. The graphs in FIGS. 3, 4 and 5 show the utilization of each gate at the end of fifteen minute intervals.

8.1.1 Routine Routing

The routine scenario considered periodic routing under fixed arrival rates. With asymmetric arrival and service rates across gates, zero transmission costs and starting from a probability assignment that produced significant imbalance in the first interval, the routing algorithm produced balanced total utilization in the second interval after only two iterations (FIG. 7a).

Figure 7:
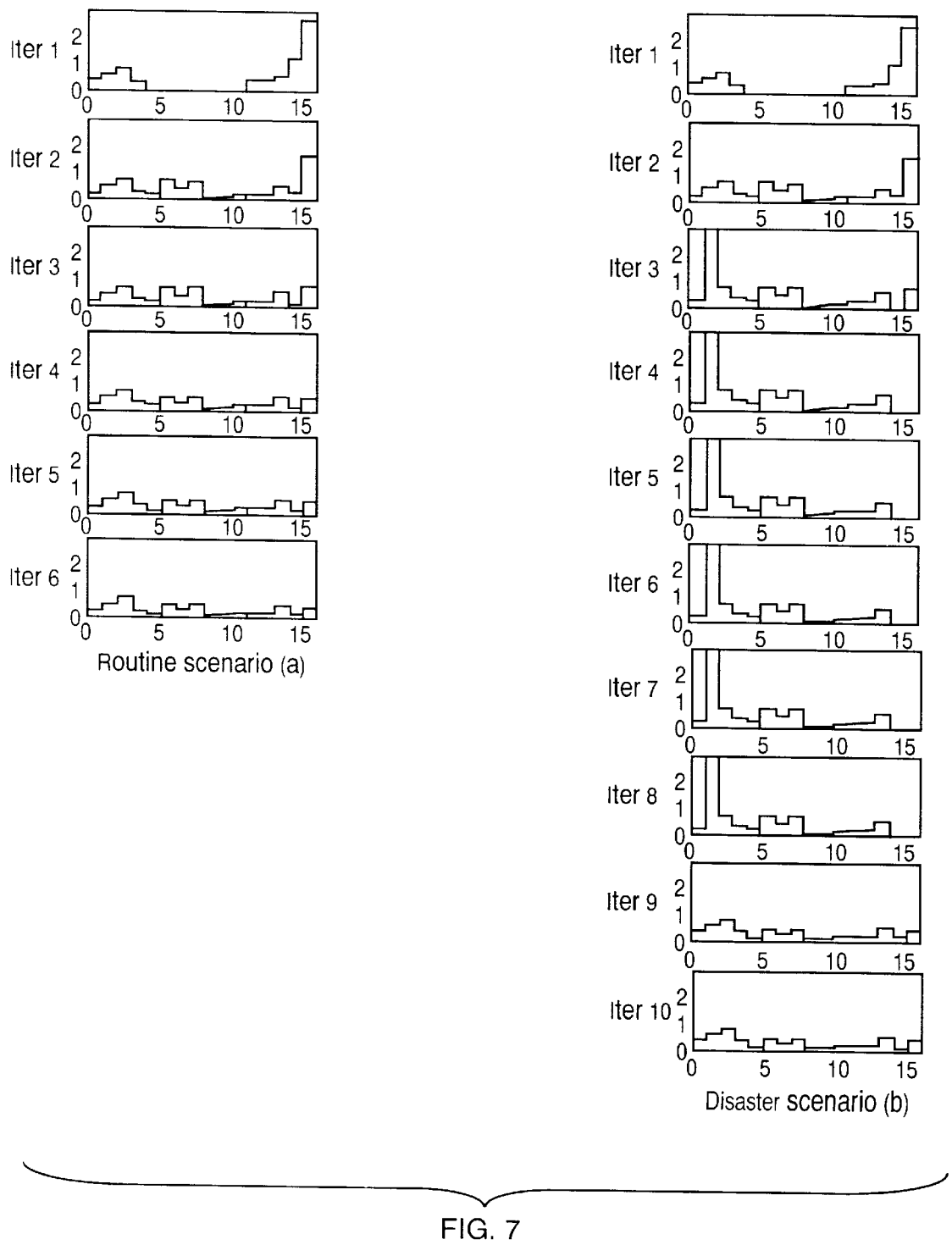
FIG. 7. is a diagram depicting utilization levels (y-axis) at each gate (x-axis) for two scenarios: (a) routine routing and (b) disaster routing.

FIG. 7a presents the graphs of gate utilizations at each fifteen minutes interval with time advancing from top to bottom. At the end of the first interval (top graph), during which manual probability assignments from the decision tree were used, we can see the imbalance in the loads. Gates 15 and 16 are both loaded above their capacity for handling work and gates 5 through 11 have no work. The routing algorithm recovers the imbalance within the next two iterations. It is not apparent from the figure but routing to gate 16 which had very high workload at the end of the first interval (the first chance given to our routing algorithm) was almost completely shut off. In the two subsequent intervals, the utilization at gate 16 reflected the back-logged work.

By the end of the hour, the system is in a stable state. No more load balancing can be achieved beyond that shown in the fourth graph from the top. This is due to complex dependencies in the decision tree dictating equal values of probabilities and the fact that some loads are restricted to go to particular gates (routing probabilities are fixed at 1).

8.1.2 Disaster Routing

The disaster scenario had the service rates at one gate suddenly go down for a segment of time spanning three intervals. The intent was to simulate the case when natural disasters at any of the call centers may cause a disruption in service. Intuitively, we would expect a long queue to build up at the relevant gate for the first fifteen minute interval when the disaster occurs until another probability assignment is made. The questions of interest are: (i) can the routing algorithm adequately reassign the probabilities to recover from the load imbalance caused by the disaster? (ii) how much imbalance can the algorithm recover? (iii) and how long would it take to recover for a given drop of the service rate at a particular gate?

FIG. 7b presents the performance the routing algorithm for this scenario. The disaster strikes at the end of the 2nd period when the service rate at gate 2 goes down from 0.2 to 0.005. This is reflected in the third graph from the top which is the snapshot at the end of the first interval after the occurrence of the disaster. The disaster ends at the end of the of the 5th period. During the duration of the disaster, the utilization level of gate 2 shoots up to almost 40 which is not apparent from the graph. Additional analysis of the output (not presented here) shows that the routing algorithm limits the number of call arrivals to gate 2 to the minimum possible during this time. In effect, initially approximately 2000 calls were being routed to gate 2 during each interval. During the duration of the disaster, only around 70 calls are permitted to arrive at gate 2. The pathologically high utilization level at gate 2 in graphs 3–8 from the top in FIG. 7b reflect the queued calls at gate 2. Any arrivals that do occur are allowed only because of the dependencies between probabilities. Most of the newly arriving work is distributed among the first few gates. When the disaster ends, it takes the routing algorithm three iterations (45 minutes) to stabilize.

8.2 Performance of the Prioritization Heuristic

In general, it is difficult to measure the effectiveness of the heuristic, since we do not know the true minimum of objective function when prioritizing over k partitions. However, the minimum over all partitions is a lower bound to the values achievable by the heuristic for any k, since $P_o$ is a relaxation of the prioritization problem. Recall that the nodes in the graph are partitioned into A subsets because of the decision tree.

Figure 8:
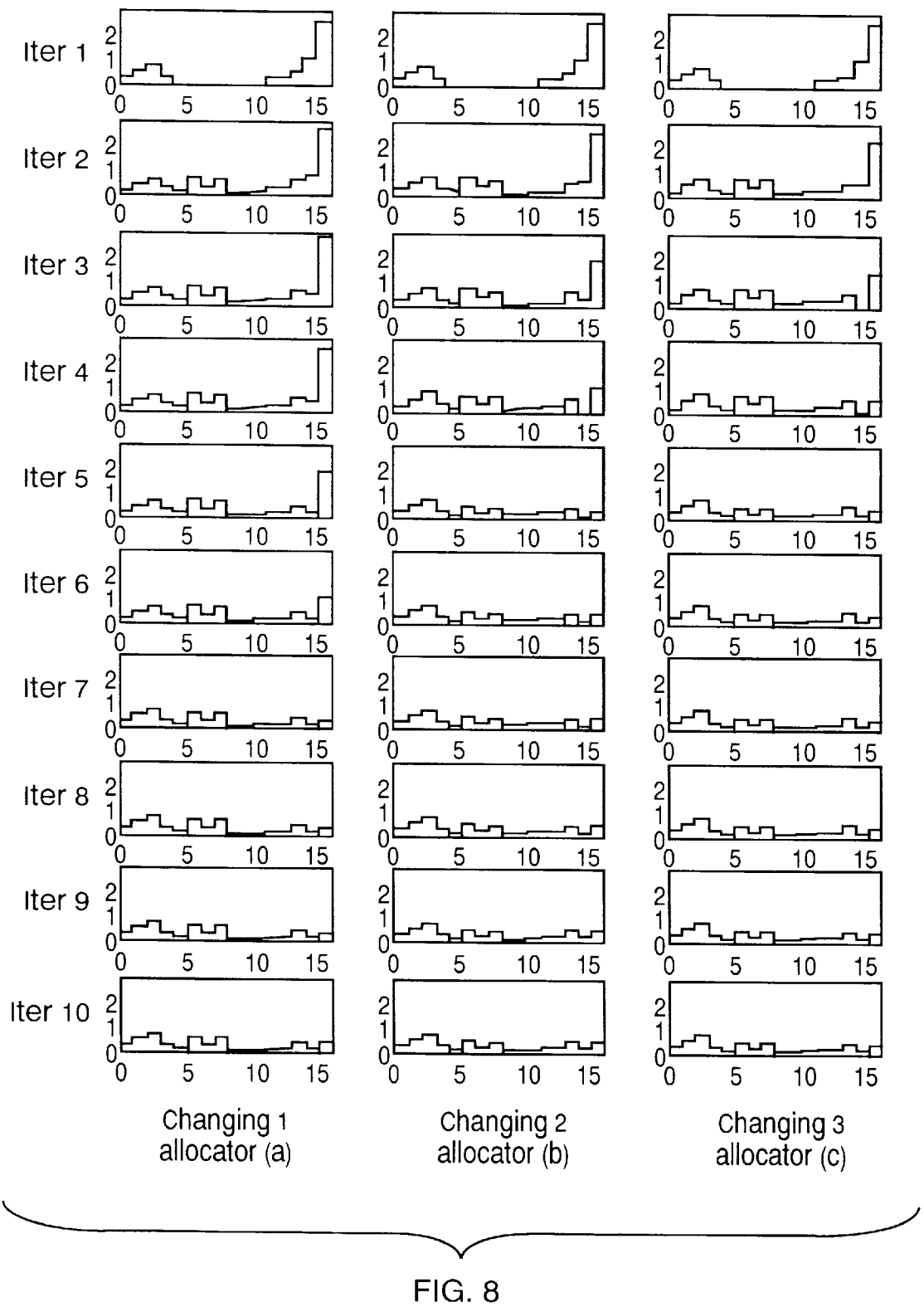
FIG. 8 is a diagram depicting utilization levels (y-axis) at each gate (x-axis) for the prioritization heuristic when optimizing only: (a) one allocator, (b) two allocators, and (c) three allocators.
Figure 9:
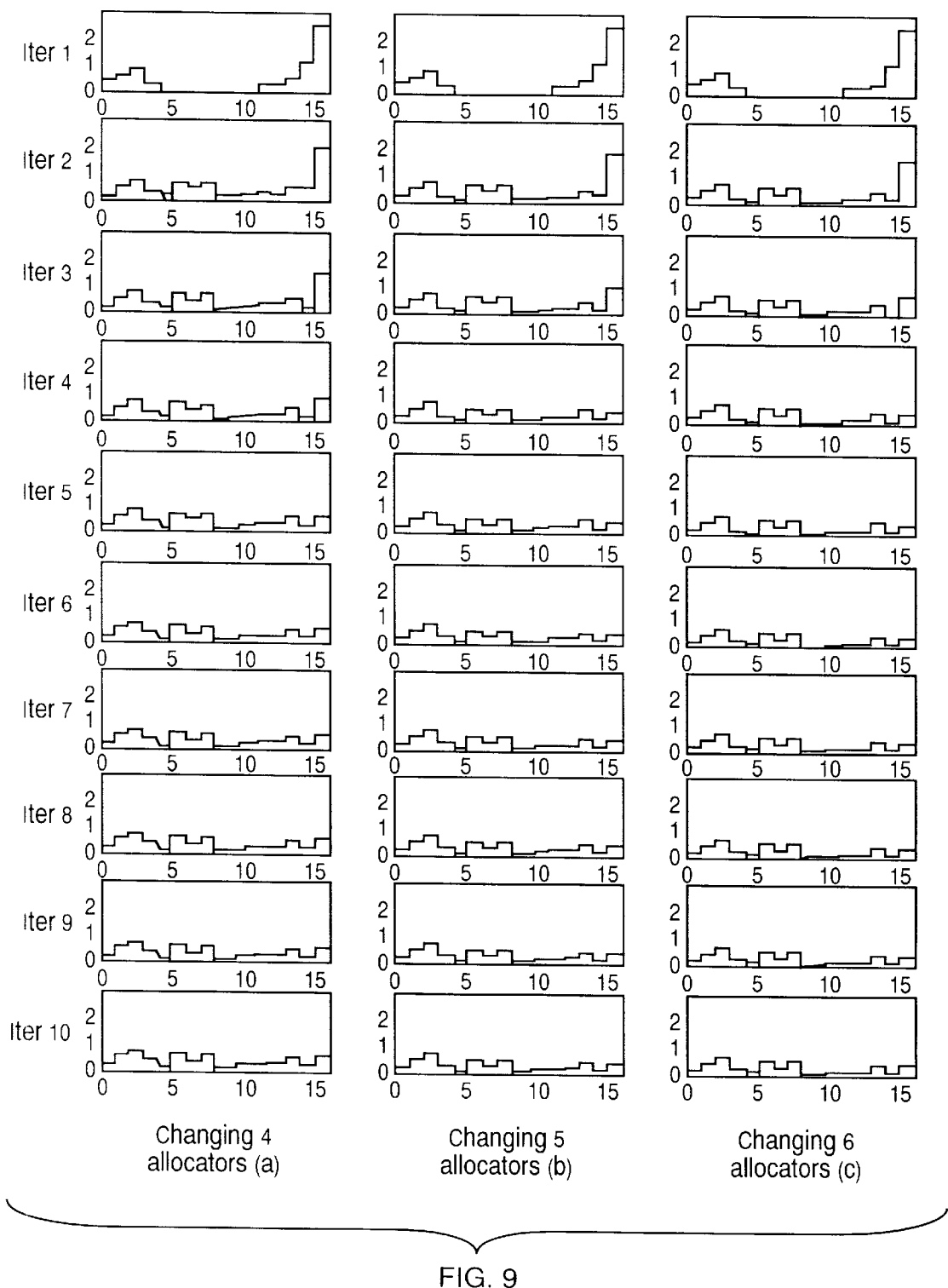
FIG. 9 is a diagram depicting utilization levels (y-axis) at each gate (x-axis) for the prioritization heuristic when optimizing only: (a) four allocators, (b) five allocators, and (c) six allocators.

FIGS. 8 and 9 show the performance of the routing algorithm when prioritizing over 1, 2, 3, 4, 5 and 6 partitions. We see that the when prioritizing over 1 partition, it takes longer for the system to become stable. However, once stabilized, prioritizing over one partition is sufficient to keep the system stable.

The time till stability in the system decreases steadily with increasing number of partitions. Optimizing over 6 partitions is practically the same as optimizing over all partitions (29 in total). The practical significance of this is for the operators who assign these probabilities. Changing only 6 allocator (partition) probabilities is significantly easier for them than changing 29.

A result not shown here is that the optimal objective function values produced by the heuristic decrease monotonically in the number of partitions until the optimal values achieved for 6 partitions are practically the same as for $P_o$. This and the resulting graphs are reassuring in that the ranking scheme which uses gradient information to prioritize the constraints performs reasonably.

APPENDIX A

A.1 Examples of degenerate least squares cases.

Simple examples can easily be constructed to demonstrate the invalidity of the least squares approach for inferring unique non-negative arrival rates at the nodes. For example, suppose there are two nodes and two gates, then with the following assignment, $p_{11}=1$, $p_{12}=0_1$, $p_{21}=p_{22}=0.5$ and the number of arrivals at the gates $N_1=10$ and $N_2=11$, we get negative estimates for the arrival rates when solving the system of equations $P^T\lambda = N\Delta t$, the result being $\lambda_1 = -1\Delta t$ and $\lambda_2 = 24\Delta t$. Similarly we either have an inconsistent system of equations if we have different number of arrivals at the gates or we have a singular system of equations if we get the same number of arrivals, given the following probability assignment, $p_{11}=p_{12}=p_{21}=p_{22}=0.5$.

In general, things are much worse than the above examples. In both examples above, we did indeed have at least the same number of equations as the number of gates allowing us to determine uniquely the solution to the system. In the real world, we may have, for instance—to pick a number, almost 20 equations from which to determine 100 parameters, which are further required to be non-negative.

A.2 Example of non-convergence of the proposed estimator.

Following is a trivially constructible case when the estimator will not converge to the true rates even when the rates remain constant across time. Suppose we have for the above two nodes, two gate example, the following probability assignment for a time periods: $p_{11}=p_{22}=1$, $p_{12}=p_{21}=0$. Then the estimator gives the value $$\frac{N_i}{\Delta_t}, i = 1, 2$$

at all time periods. It is obvious that this estimator cannot converge. A more intelligent estimator might take a weighted average of the current and past estimates to achieve convergence.

APPENDIX B

B.1 Strict positivity of $\bar{q}$.

At every iteration of the algorithm, the vector $\bar{q}$ is strictly positive. To see this, note that for any solution d to the DFP, from the constraint $d^T Q^{-2} d \leq 1$, $$\sum_{j=1}^{n} \left(\frac{\bar{d}_j}{\bar{q}_j}\right)^2 \leq 1 \Leftrightarrow \left(\frac{\bar{d}_j}{\bar{q}_j}\right)^2 \leq 1 \Leftrightarrow -1 \leq \frac{\bar{d}_j}{\bar{q}_j} \leq 1 \Leftrightarrow \bar{d}_j + \bar{q}_j \geq 0$$

$$j = 1, \ldots, n.$$

Since $0 < \alpha < 1$, step 4 of the algorithm will never violate the strict positivity of q.

B.2 Solving the DFP.

Since the matrix $\bar{Q}^{-2}$ is positive definite, the DFP is a convex programming problem and the KKT conditions are necessary and sufficient for characterizing optimal solutions of DFP. These conditions are:

$$\bar{g} + A^T\pi + 2\alpha\bar{Q}^{-2}d = 0,$$
$$\alpha \geq 0,$$
$$\alpha(d^T\bar{Q}^{-2}d - 1) = 0,$$
$$d^T\bar{Q}^{-2}d \leq 1,$$
$$Ad = 0.$$

The solution to these equations can be obtained by solving the following system of equations:

$$\bar{Q}^{-2}d + A^T\pi = -\bar{g},$$
$$Ad = 0.$$

If $(\bar{d},\bar{\pi})$ is a solution to the above system and $\bar{Q}^{-2}\bar{d} \neq 0$ we can let $$\bar{d} = \frac{\bar{d}}{\sqrt{\bar{d}^T\bar{Q}\bar{d}}}, \bar{\pi} = \bar{\pi}, \bar{\alpha} = \frac{1}{2\sqrt{\bar{d}^T\bar{Q}\bar{d}}}.$$

Then straightforward substitution will show that $(\bar{\alpha}, \bar{d}, \bar{\pi})$ is a solution to the KKT conditions of the DFP.

B.3 $\bar{d}$ is a feasible descent direction.

Moreover, when $\bar{Q}^{-2}\bar{d} \neq 0$, $\bar{d}$ is a feasible descent direction. Since $Ad=0$ and by positive definiteness of $\bar{Q}^{-2}$, $$\bar{g}'\bar{d}=\bar{d}'(\bar{Q}^{-2}\bar{d}+A'\bar{\pi})=-\bar{d}'\bar{Q}^{-2}\bar{d}<0.$$

B.4 Termination.

When $\bar{Q}^{-2}\bar{d}=0$, the point q is a KKT point of problem $P_o$.

To see this, note that the KKT conditions for $P_o$ are $$g + A^T\pi - v = 0,$$
$$Aq = e,$$
$$v^Tq = 0,$$

For any strictly positive solution to the above system, $v^Tq=0$ and $v \geq 0 \rightarrow v=0$. Then the conditions reduce to:

$$\begin{bmatrix} A_{I_k^\epsilon I_k^\epsilon} & 0 \\ 0 & \tilde{A}_{I_k^\epsilon I_k^\epsilon} \end{bmatrix} \begin{bmatrix} q_{I_k^\epsilon} \\ \tilde{q}_{I_k^\epsilon} \end{bmatrix} = e,$$

Since $\bar{q}>0$ satisfies $\overline{Aq}=e$, and $\bar{Q}^{-2}\bar{d}=0 \rightarrow \bar{g}+=0$, $A^T\bar{\pi}=$KKT conditions for $P_o$ are satisfied by $\bar{q}$.

APPENDIX C

1 Justifying the DFP.

Assume WLOG that we are optimizing over the first k constraints of $P_o$. First note from the structure of the matrix A (section 4.5) that if we are optimizing over the set of constraints i=1, ..., k, we can write the constraints as $$\begin{bmatrix} A_{I_k \cdot I_k^c} & 0 \\ 0 & \tilde{A}_{I_k \cdot I_k^c} \end{bmatrix} \begin{bmatrix} q_{I_k^c} \\ \tilde{q}_{I_k^c} \end{bmatrix} = e,$$

where $\tilde{A}_{I_k \cdot I_k^c}$ and $\tilde{q}_{I_k^c}$ are respectively the complements of the constraint set over which we are optimizing and the variables that can be changed allowing us to write the DFP for the affine scaling algorithm of section 6 as:

$$\min \begin{bmatrix} \bar{g}_{I_k^c}^T & \tilde{g}_{I_k^c}^T \end{bmatrix} \begin{bmatrix} d_{I_k^c} \\ \bar{d}_{I_k^c} \end{bmatrix}$$

$$\text{s.t} \quad \begin{bmatrix} A_{I_k^* I_k^c} & 0 \\ 0 & \tilde{A}_{I_k^* I_k^c} \end{bmatrix} \begin{bmatrix} d_{I_k^c} \\ \bar{d}_{I_k^c} \end{bmatrix} = 0,$$

$$\begin{bmatrix} d_{I_k^c}^T & \tilde{d}_{I_k^c}^T \end{bmatrix} \begin{bmatrix} \overline{Q}_{I_k^c \cdot I_k^c}^{-2} & 0 \\ 0 & \tilde{Q}_{I_k^c \cdot I_k^c}^{-2} \end{bmatrix} \begin{bmatrix} d_{I_k^c} \\ \bar{d}_{I_k^c} \end{bmatrix} \leq 1,$$

$$\tilde{d}_{I_k^c} = 0,$$

where $\tilde{d}_{I_k^c}$ needs to be zero since $\tilde{q}_{I_k^c}$ is constant, which is equivalent to $$\min \quad \bar{g}_{I_k^c}^T d_{I_k^c}$$

$$\text{s.t.} \quad A_{I_k \cdot I_k^c} d_{I_k^c} = 0,$$

$$d_{I_k^c}^T \overline{Q}_{I_k^c \cdot I_k^c}^{-2} d_{I_k^c} \leq 1,$$

which is the DFP used in our heuristic.

It will be apparent to those skilled in the art that various modifications and variations can be made in the methods and apparatus consistent with the present invention without departing from the scope or spirit of the invention. Other modification will be apparent to those skilled in the art from consideration of the specification and practice of the invention disclosed herein. The specification and examples should be considered as exemplary only, with the true scope and spirit of the invention being indicated by the following claims.

What is claimed is:

1. A method for modifying probabilistic routing parameters in a routing network for a next time frame, comprising the steps, performed on a processor, of:
   receiving information regarding a measured number of calls routed to each of a plurality of output nodes for a previous time frame;
   estimating a number of calls routed to each of a first plurality of input nodes origins for the next time frame based on the measured number;
   calculating a first plurality of probabilistic routing parameters for the next time frame based on the estimated number; and
   displaying the first plurality of probabilistic routing parameters to a network manager, wherein the network manager modifies the first plurality of probabilistic routing parameters.

2. The method according to claim 1, wherein the estimating step further comprises the substep of:
   approximating a number of calls routed to each of the plurality of output nodes for the next time frame; and
   estimating a number of calls routed to each of a first plurality of input nodes origins for the next time frame based on the approximated number.

3. The method according to claim 1, wherein the calculating step includes using quadratic programming.

4. The method of claim 3, wherein the quadratic programming includes linear constraints.

5. The method of claim 3, wherein the calculating step includes constraining a second plurality of calculated probabilistic routing parameters to be equal, said second plurality of calculated probabilistic routing parameters being a subset of the first plurality of calculated probabilistic routing parameters.

6. The method of claim 1, wherein the step of receiving information includes measuring a number of calls routed to each of a plurality of output nodes.

7. A method for modifying probabilistic routing parameters in a routine network for a next time frame, comprising the steps, performed on a processor, of:
   receiving information regarding a measured number of calls routed to each of a plurality o output nodes for a previous time frame;
   estimating a number of calls routed to each of a first of a plurality of input nodes origins for the next time frame based on the measured number;
   calculating the first plurality of probabilistic routing parameters for the next time frame based on the estimated number wherein the calculating step includes constraining a second plurality of calculated probabilistic routine, parameters to be equal, said second plurality of calculated probabilistic routine parameters being a subset of the first plurality of calculated probabilistic routing parameters, and wherein the calculating step further comprises the steps of:
   determining a first efficiency increase associated with a first node;
   storing the first efficiency increase in a location associated with the first input node;
   determining the next efficiency increase associated with a next input node;
   storing the next efficiency increase in a location associated with the next input node;
   repeating the determining and steps for each next input node;
   selecting a second plurality of input nodes that provide higher efficiency increases than the other input nodes, the second plurality of input nodes being subset of the first plurality of input nodes; and
   calculating a third plurality of probabilistic routing parameters for only the selected second plurality of input nodes and constraining the remaining probabilistic routing parameters to be unchanged from the previous time frame; and
   displaying the first plurality of probabilistic routing parameters to a network manager, wherein the network manager modifies the first plurality of probabilistic routing parameters.

8. The method of claim 6, wherein the selecting step includes inputting the desired cardinality of the second plurality of input nodes.

9. A method for modifying probabilistic routing parameters in a routing network for a next time frame, comprising the steps, performed on a processor, of:
   receiving information regarding a measured number of calls routed to each of a plurality of output nodes for a previous time frame;

estimating a number of calls routed to each of a plurality of input nodes for the next time frame based on the measured number;

calculating a first plurality of probabilistic routing parameters for the next time frame based on the estimated number; and automatically modifying the first plurality of probabilistic routing parameters.

10. The method of claim 9, wherein the step of calculating a first plurality of probabilistic routing parameters is limited to calculating probabilistic routing parameters for a second plurality of input nodes, said second plurality of input nodes being s subset of the first plurality of input nodes.

11. An apparatus for modifying probabilistic routing parameters of a routing network for a next time frame, comprising:

means for receiving information regarding a measured number of calls routed to each of a plurality of output nodes for a previous time frame;

means for estimating a number of calls routed to each of a plurality of input nodes for the next time frame based on the measured number;

means for calculating a first plurality of probabilistic routing parameters for the next time frame based on the estimated number; and means for displaying the first plurality of probabilistic routing parameters to a network manager, wherein the network manager modifies the probabilistic routing parameters.

12. The apparatus of claim 11, wherein the means for estimating further comprises:

means for approximating a number of calls routed to each of the plurality of output nodes for the next time frame; and means for estimating a number of calls routed to each of a plurality of input nodes for the next time frame based on the approximated number.

13. The apparatus of claim 11, wherein the means for calculating includes means for quadratic programming.

14. The apparatus of claim 11, wherein the means for receiving includes means for measuring a number of calls routed to each of a plurality of output nodes.

15. An apparatus for modifying probabilistic routing parameters of a routing network for a next time frame, comprising:

a measuring device to measure a number of calls routed to each of a plurality of output nodes during a previous time frame;

an estimator to estimate for the next time frame a number of calls routed to each of a plurality input nodes based on the measured number; and a probability calculator to calculate a plurality of probabilistic routing parameters to route calls.

16. A computer program product comprising:

a computer usable medium having computer readable code embodied therein for processing data for a routing network to route calls along communication paths, the computer usable medium comprising:

a receiving module configured to receive information regarding a measured number of calls routed to each of a plurality of output nodes for a current time frame;

an estimating module configured to estimate, based on the measured number, a number of calls routed to each of a plurality of input nodes for the next time frame;

a calculating module configured to calculate a plurality of probabilistic routing parameters for the next time frame based on the estimated number; and a displaying module configured to display the probabilistic routing parameters to a network manager based on the calculated plurality of probabilistic routing parameters, wherein the network manager modifies the plurality of probabilistic routing parameters.

17. A method for setting probabilistic routing parameters at a call center for a next time frame, comprising the steps, performed on a processor, of:

measuring for each of a plurality of output nodes a number of calls routed to the output node;

storing each measured number at a first plurality of storage locations in a memory, each one of the first plurality of storage locations being associated with one of the plurality of output nodes;

estimating, for each of a plurality of input nodes, a number of calls routed to each input node from the plurality of numbers stored in the first plurality of storage locations;

storing each estimated number at a second plurality of storage locations in the memory, each one of the second plurality of storage locations being associated with one of the plurality of input nodes;

calculating a plurality of probabilistic routing parameters for the next time frame based on the numbers stored at the second plurality of storage locations; and modifying the probabilistic routing parameters based on the calculated plurality of probabilistic routing parameters.

18. The method according to claim 17, wherein the calculating step includes using the technique of quadratic programming.

19. The method of claim 17, wherein the first plurality of calculated probabilities includes a second plurality of calculated probabilities constrained to be equal.

20. A computer program product comprising:

a computer usable medium having computer readable code embodied therein for processing data for a routing network to route calls along communication paths, the computer usable medium comprising:

a receiving module configured to receive information regarding a measured number of calls routed to each of a plurality of output nodes;

a first storing module configured to store each measured number at a first plurality of storage locations in a memory, each one of the first plurality of storage locations being associated with one of the plurality of output nodes;

an estimating module configured to estimate from the plurality of numbers stored in the first plurality of storage locations for each of a plurality of input nodes a number of calls routed to each of the plurality of input nodes;

the first storing module further configured to store each estimated number at a second plurality of storage location in the memory, each one of the second plurality of storage locations being associated with one of the plurality of input nodes;

a calculating module configured to calculate a plurality of probabilistic routing parameters for the next time frame based on the plurality of measured numbers stored at the second plurality of storage locations; and a modifying module configured to set the probabilistic routing parameters based on the calculated plurality of probabilistic routing parameters.

* * * * *

UNITED STATES PATENT AND TRADEMARK OFFICE
CERTIFICATE OF CORRECTION

PATENT NO : 6,115,462
DATED : September 5, 2000
INVENTOR(S) : Leslie David Servi, et al.

It is certified that error appears in the above-identified patent and that said Letters Patent are hereby corrected as shown below:

Col. 30, line 20
replace "routine"
with --routing--.

Col. 30, line 23
replace "o"
with --of--.

Col. 30, line 32
replace "routine"
with --routing--.

Col. 30, line 33
replace "routine"
with --routing--.

Signed and Sealed this

Twenty-fourth Day of April, 2001

*Attest:*

NICHOLAS P. GODICI

*Attesting Officer*   Acting Director of the United States Patent and Trademark Office